(12) United States Patent  
Plata

(10) Patent No.: US 8,800,536 B2  
(45) Date of Patent: Aug. 12, 2014

(54) SYSTEM AND METHOD FOR PREPARING AN OPTIMIZED FUEL MIXTURE

(75) Inventor: Carlos A. Plata, Bogota (CO)

(73) Assignee: Megaion Research Corporation (PA)

( * ) Notice: Subject to any disclaimer, the term of this patent is extended or adjusted under 35 U.S.C. 154(b) by 959 days.

(21) Appl. No.: 12/805,790

(22) Filed: Aug. 19, 2010

(65) Prior Publication Data

US 2011/0056445 A1 Mar. 10, 2011

Related U.S. Application Data

(63) Continuation-in-part of application No. 12/648,150, filed on Dec. 28, 2009, now abandoned, which is a continuation of application No. 11/785,572, filed on Apr. 18, 2007, now Pat. No. 7,637,254.

(60) Provisional application No. 60/792,616, filed on Apr. 18, 2006.

(51) Int. Cl.  
*F02M 27/04* (2006.01)

(52) U.S. Cl.  
USPC .......................................................... 123/536

(58) Field of Classification Search  
USPC ..................... 123/536–539, 260, 267, 305  
See application file for complete search history.

(56) References Cited

U.S. PATENT DOCUMENTS

| | | | |
|---|---|---|---|
| 1,982,484 A * | 11/1934 | Runge | 123/537 |
| 2,146,265 A * | 2/1939 | Moore, Jr. | 123/294 |
| 2,324,392 A | 7/1943 | Hinchman | |
| 4,140,090 A | 2/1979 | Lindberg | |
| 4,265,201 A | 5/1981 | Gerry | |
| 4,340,019 A * | 7/1982 | Barnert et al. | 123/256 |
| 4,434,771 A | 3/1984 | Slomnicki | |
| 4,519,357 A | 5/1985 | McAllister | |
| 4,651,703 A | 3/1987 | Hoppie | |
| 5,222,993 A * | 6/1993 | Crane | 123/256 |
| 6,305,363 B1 * | 10/2001 | Klomp | 123/533 |
| 6,314,732 B1 | 11/2001 | Lookholder | |
| 6,390,053 B2 * | 5/2002 | Gillis et al. | 123/267 |
| 6,463,917 B1 | 10/2002 | Silver | |
| 6,990,965 B2 | 1/2006 | Varasundharosoth | |
| 7,341,049 B2 | 3/2008 | Clack | |
| 7,370,626 B2 | 5/2008 | Schubert | |
| 7,568,473 B2 | 8/2009 | Motouchi | |
| 7,637,254 B2 * | 12/2009 | Plata | 123/538 |
| 7,798,133 B2 | 9/2010 | Clack | |

(Continued)

FOREIGN PATENT DOCUMENTS

JP 55-139961 11/1980

OTHER PUBLICATIONS

Office Action, dated Feb. 8, 2013, received in the related U.S. Appl. No. 12/805,788.

(Continued)

*Primary Examiner* — M. McMahon  
(74) *Attorney, Agent, or Firm* — PROTECT IT! IP LLC; Paul Roberts

(57) ABSTRACT

Aspects of the present invention relate to systems and method for converting ozone and fuel into mechanical energy and waste products. In some embodiments, a super-combustor may be used to provide a combustion engine with an improved ability to combust fuel. Certain embodiments of the invention may provide for an improved spark plug or modified engine having a super-combustor built in.

22 Claims, 26 Drawing Sheets

(56) References Cited

U.S. PATENT DOCUMENTS

| | | |
|---|---|---|
| 7,938,103 B2 | 5/2011 | Keays |
| 8,028,682 B2 | 10/2011 | Clack |
| 8,136,510 B2 | 3/2012 | Clack |
| 8,205,600 B2 | 6/2012 | Hammer |
| 8,464,695 B2 | 6/2013 | Ikeda |
| 2005/0016507 A1 | 1/2005 | Tamol |
| 2005/0126550 A1* | 6/2005 | Varasundharosoth et al. ............ 123/539 |
| 2005/0147546 A1 | 7/2005 | Long |
| 2005/0172929 A1* | 8/2005 | Strauss ............ 123/260 |
| 2009/0301444 A1 | 12/2009 | Kandnery |
| 2010/0083939 A1* | 4/2010 | Hammer et al. ............ 123/539 |
| 2010/0132660 A1* | 6/2010 | Nerheim ............ 123/260 |
| 2011/0056445 A1 | 3/2011 | Plata |
| 2011/0108009 A1 | 5/2011 | Plata |
| 2011/0118957 A1 | 5/2011 | Plata |
| 2012/0118262 A1 | 5/2012 | Johnson |
| 2013/0112157 A1 | 5/2013 | Brown |

OTHER PUBLICATIONS

The Office Action, dated Aug. 15, 2013, received in the related U.S. Appl. No. 12/805,788.

* cited by examiner

Prior Art

PRIOR ART

PRIOR ART

PRIOR ART

PRIOR ART

PRIOR ART

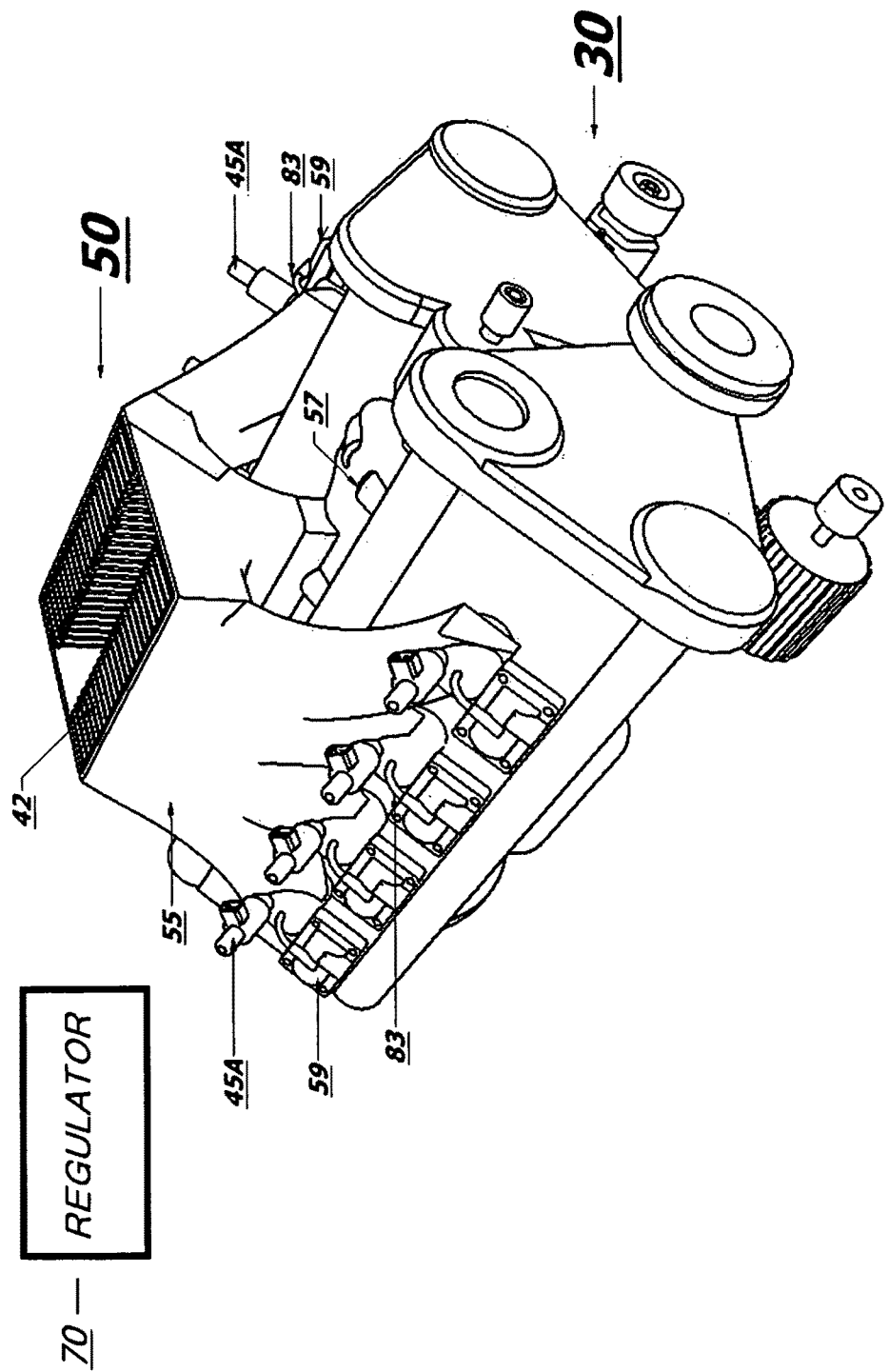

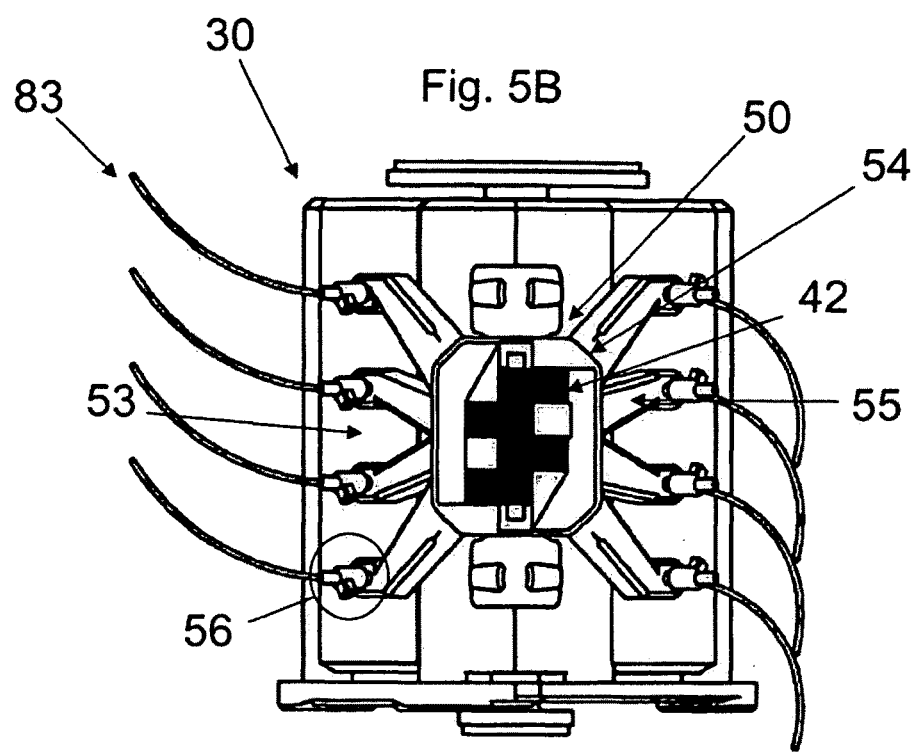

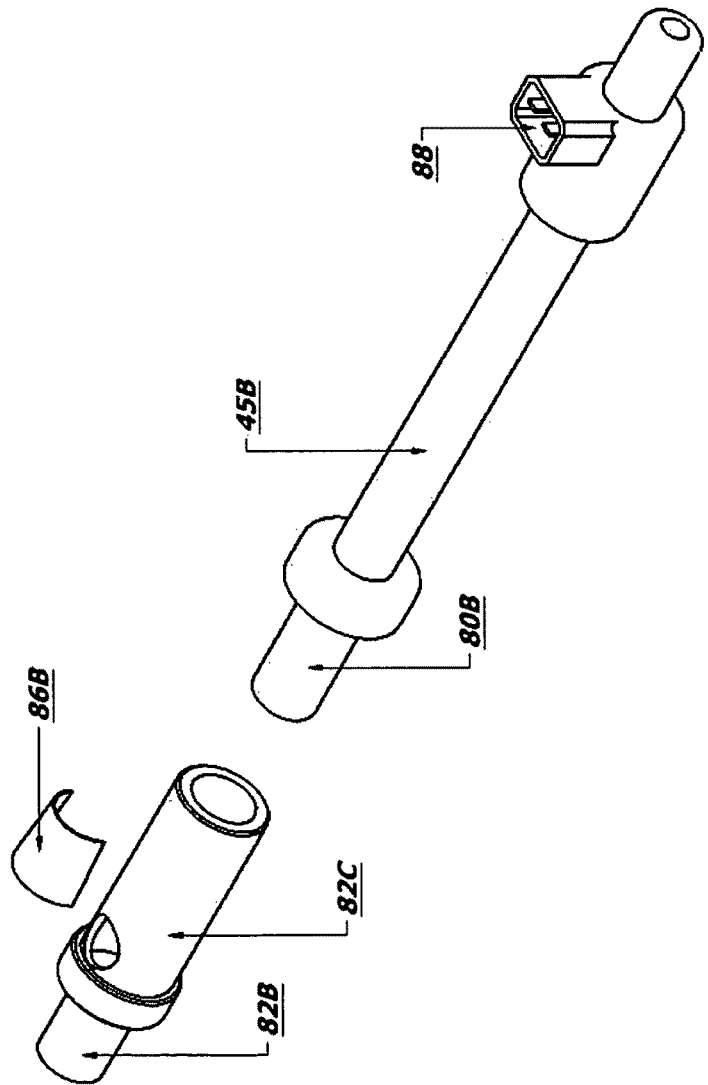

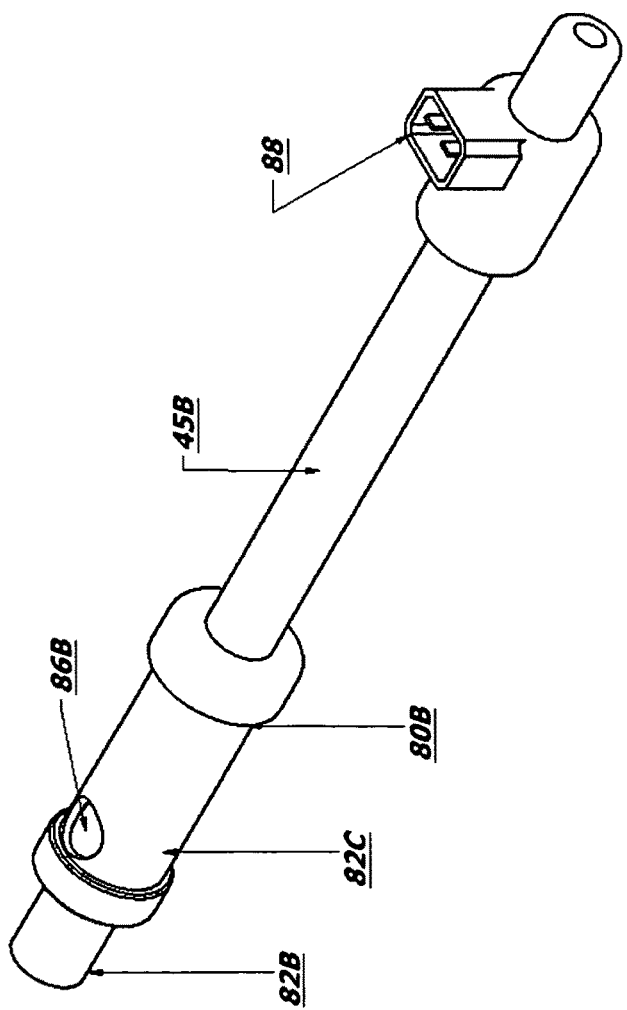

SYSTEM AND METHOD FOR PREPARING AN OPTIMIZED FUEL MIXTURE

CROSS-REFERENCE TO RELATED APPLICATIONS

This application is a Continuation-In-Part of U.S. application Ser. No. 12/648,150 filed Dec. 28, 2009 which is a continuation of patent application Ser. No. 11/785,572 (filed Apr. 18, 2007) now U.S. Pat. No. 7,637,254 (issued Dec. 29, 2009) which claims the benefit of priority to U.S. Provisional application 60/792,616 filed Apr. 18, 2006.

FIELD OF THE INVENTION

The invention relates to a system and method for preparing an optimized fuel mixture, and more particularly, to a system and method for producing ozone and gaseous fuel and blending same in a manner to produce an optimized fuel mixture for more efficient combustion.

BACKGROUND OF THE INVENTION

Conventional internal combustion engines rely upon a process for creating a mixture of ambient air and fuel. Suction created by the engine draws the air/fuel mixture into the cylinder of the internal combustion engine where it is ignited so as to drive a piston in a downward motion. This process is repeated so that the piston alternates between being in an open and a compressed position, which rotates a crank shaft and produces rotational force. In the case of engines utilizing fuel injection, fuel injectors may directly inject fuel into the cylinder when the piston is in its compressed state just prior to combustion.

FIG. 1 illustrates an embodiment of a standard combustion engine. The combustion engine has an engine block 10, ignition coils 11, fuel injectors 12, an air intake 13, and air intake manifold 14. Gasified fuel enters the engine block 10 through the injectors 12 and air enters through the air intake 13. The process of combusting the gas in the cylinder cores 15 is illustrated in FIGS. 2A-2D. In the conventional system fuel may not be gasified adequately or completely.

FIGS. 2A-2D illustrate the combustion process inside the cylinder of an engine. In FIG. 2A, part of the engine block 1 is shown. Fuel and air (containing oxygen) is fed into the cylinder 2 through input port 3. The crankshaft 4 turns causing the piston head 5 to withdraw from the cylinder top 6, FIG. 2B. Simultaneously, the input port 3 continues to fill the cylinder with a combination of fuel and gas. The crankshaft 4 continues to turn causing the piston head 5 to compress the fuel and air in the cylinder 2, FIG. 2C. Spark plug 7 ignites the fuel and air when the piston head 5 reaches the cylinder top 6. The resulting explosion causes the piston head to push downward, turning the crankshaft 4, FIG. 2D. Carbon dioxide, water, heat, and other byproducts are expelled from the cylinder 2, from the waste gate 8.

One way to increase the strength and efficiency of the combustion process is to add ozone gas to the cylinders of an engine. Sabetay GB 714,015, JP2002-309941A, FR2288870, JP 10-205397, and JP 2000-179369 all describe a process for injecting ozone, fuel, and air into a combustion engine. As will be described in the summary and detailed description of the invention, the present invention describes a number of components and improvements not present in these systems. While these systems all differ in their design, explaining how the Sabetay system functions is helpful for understanding the state of the prior art.

As shown in FIG. 3, air enters the system at S6 (the numbers are the same as in the Sabetay patent except 'S' has been added to avoid confusion with FIGS. 2A-2D). The oxygen in the air is transformed into ozone gas via the ozone generator S3, which has tubes S4 and electrode S5. Fuel is added via fuel nozzle S7. The fuel, ozone and air are heated at copper plate S8 having perforations S9. Plate S10 is heated to a temperature higher than plate S8. The fuel from nozzle S7 is vaporized by plate S8, which then is superheated by plate S10. S11 and S12 are electromagnets each having a pole shoe S13. Homogenizer or winged/mixing wheel S14 mixes the air, ozone, and gasified fuel (the "gas mixture") to homogenize the gases. While being homogenized, electromagnets S11 and S12 subject the gas mixture to a magnetic field, which assists in the homogenization. Electrodes S16 and S17 apply a potential between them (between 6v-24v). There is no sparking between the electrodes. The gas mixture is passed then to the cylinders of the engine S20.

Applicant in reviewing Sabetay's work has made the following observations. Sabetay's apparatus has a fairly large footprint making placement in the engine compartment of a vehicle difficult. Sabetay's design also allows the ozone gas to decay back to $O_2$, because of the long period of time the ozone gas remains in the output port S19 before entering the engine S20. Sabetay's system requires electromagnets and moving parts such as homogenizer S14 (the function of S18 is not disclosed in Sabetay's Patent). These parts may require replacement, require shielding, consume energy, and increase the cost of manufacture. Sabetay's system also requires two heating plates to gasify the fuel, which requires additional energy to operate. In addition, the fuel may condense back into a fluid as it enter the engine S20, because of the time required to enter the engine chamber and also because the cooler temperature of the cylinder may promote condensation of the gasified fuel.

SUMMARY OF THE INVENTION

Aspects of the present invention provide an improved method and system for utilizing ozone gas in a combustion engine. Certain embodiments of the invention may provide a system and method for more completely combusting fuel through utilization of a double admission and combustion process. By more completely combusting the fuel inside the cylinder, fuel efficiency may be increased. In some configurations, a passive gasoline ignition chamber, fuel injected gasoline ignition chamber or fuel injected diesel ignition chamber may be a first location where the combustion process starts, and the cylinder(s) of the engine may be a second chamber where combustion ends.

BRIEF DESCRIPTION OF THE DRAWINGS

FIGS. 5A-5C: illustrate a schematic view of a combustion engine utilizing passive gasoline fuel injectors in combination with a super-combustor. FIG. 5A is a side view and FIG. 5B is a top view of the super-combustor in combination with the combustion engine. FIG. 5C illustrates a custom designed gasoline engine in combination with a super combustor.

FIG. 6A illustrates a cross-section of the combustion engine and super-combustor utilizing direct injection gasoline fuel injectors. FIG. 6B illustrates an enlarged view of the gasoline fuel injector 45 of FIG. 6A.

FIG. 7A showing the admission stroke; FIG. 7B the compression stroke; FIG. 7C the combustion stroke; FIG. 7D the exhaust stroke; and FIG. 7E the ending exhaust stroke.

FIG. 8A shows a closed view of the spark plug system, and FIG. 8B shows an exploded view of the spark plug system.

FIGS. 10A-B: illustrate a schematic view of an embodiment of a fuel injected diesel ignition chamber for use with a diesel engine. FIG. 10A shows a closed view of the fuel injected diesel ignition chamber, and FIG. 110A shows an exploded view of the fuel injected diesel ignition chamber.

FIG. 11A showing the compression stroke; FIG. 11B the admission stroke; FIG. 11C the combustion stroke; and FIG. 11D the exhaust stroke.

DETAILED DESCRIPTION OF THE PREFERRED EMBODIMENTS

Figure 1:
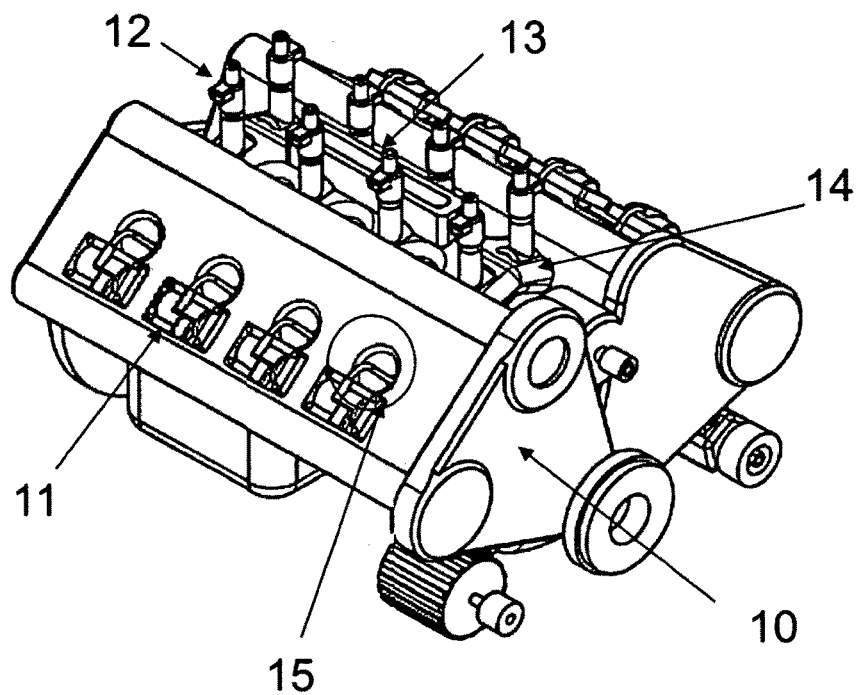
FIG. 1: illustrates a standard internal combustion engine.
Figure 2A:
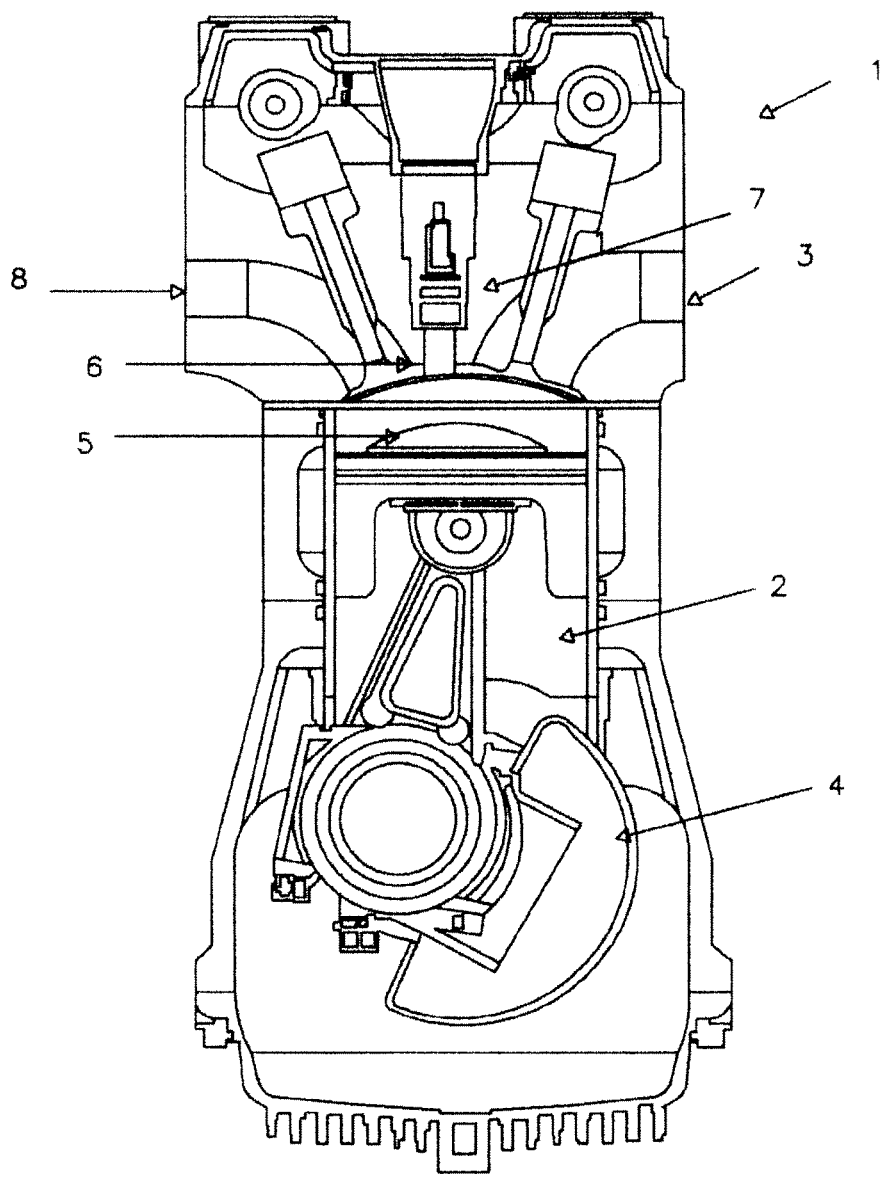
FIGS. 2A-2D: illustrate the movement a piston head in a cylinder.
Figure 2B:
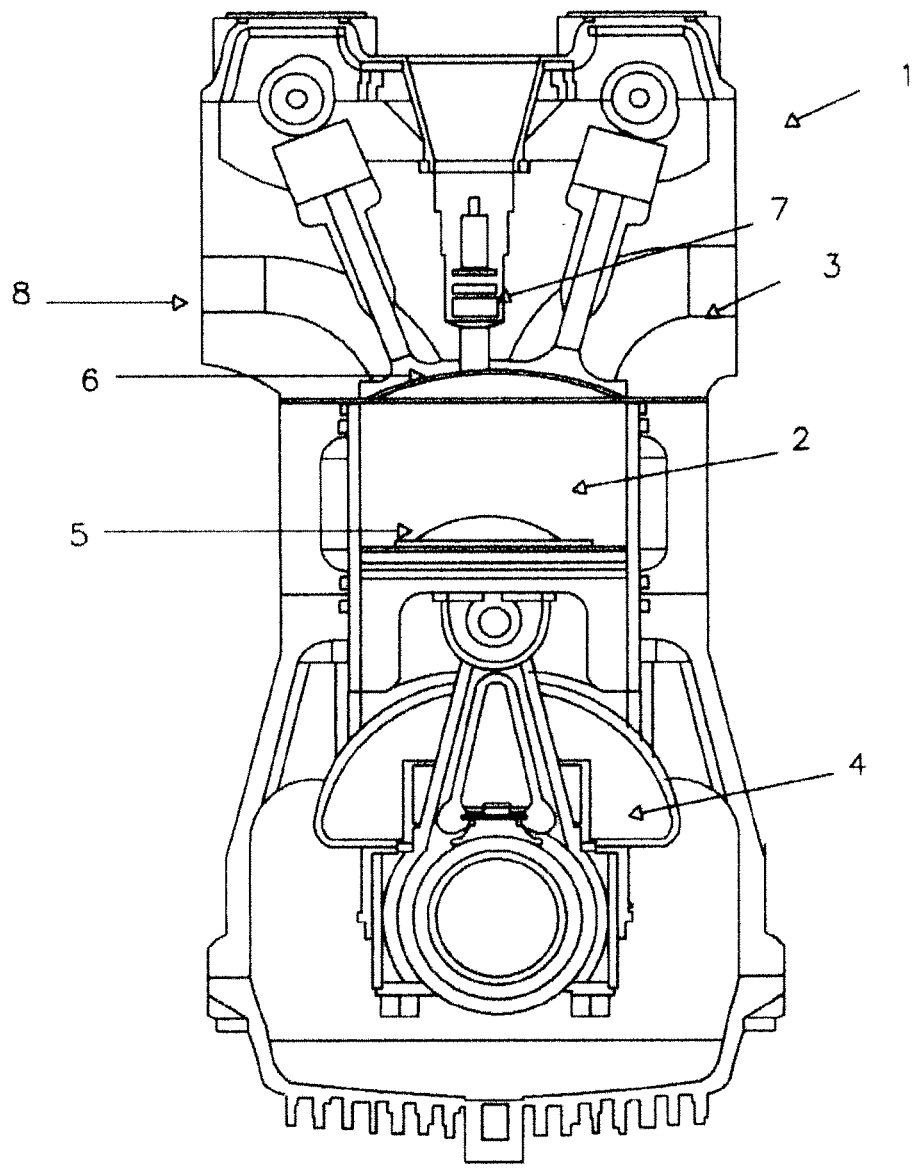
Figure 2C:
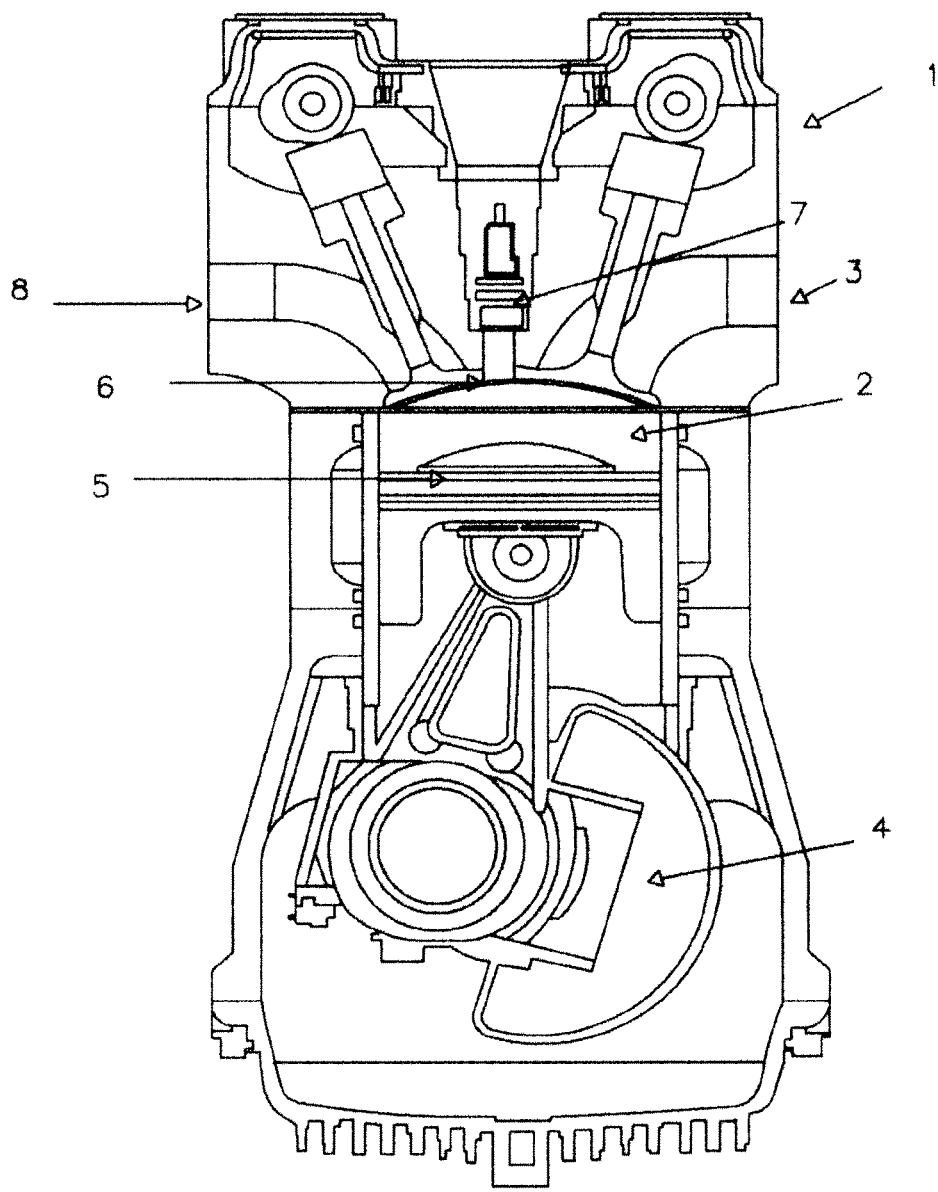
Figure 2D:
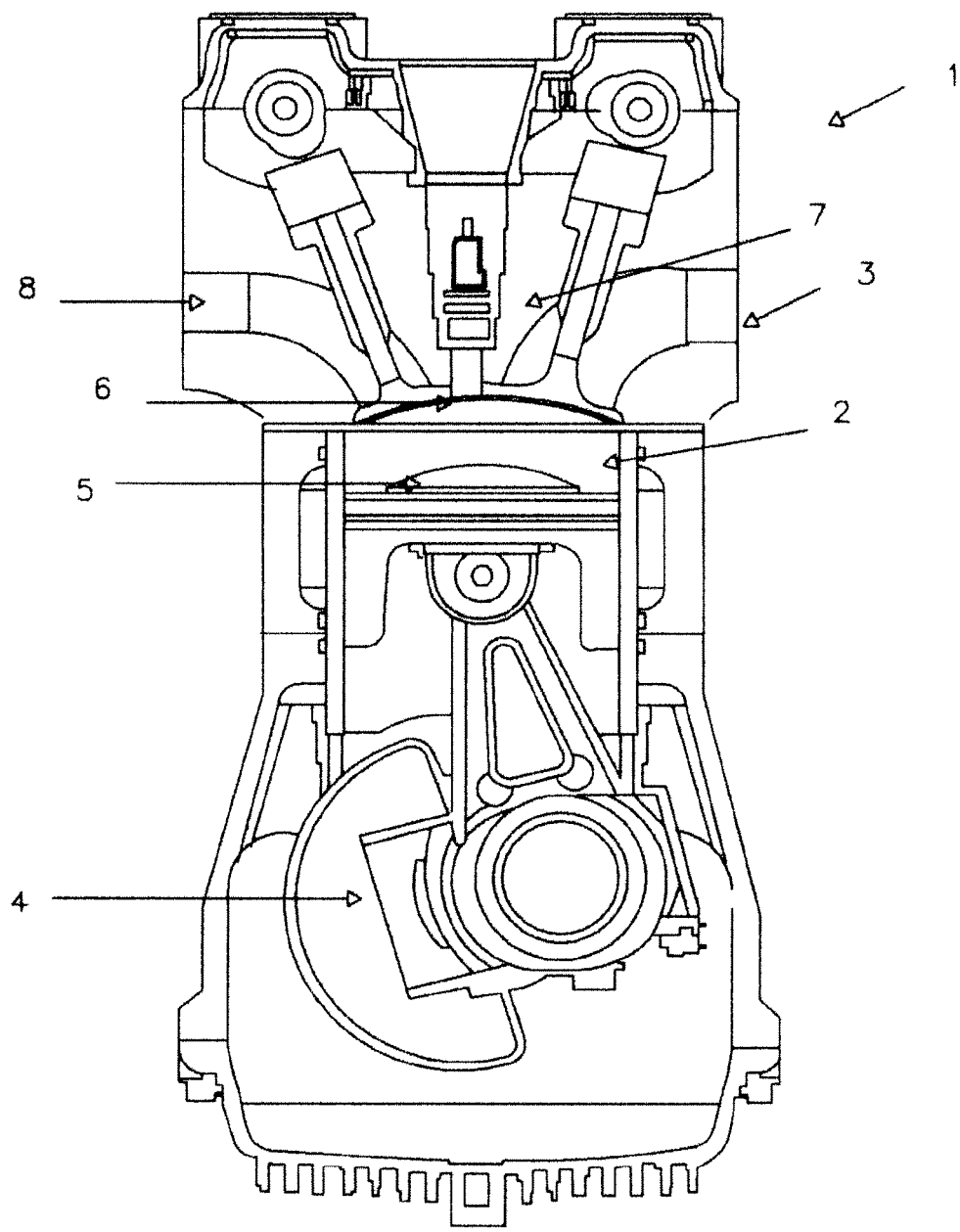
Figure 3:
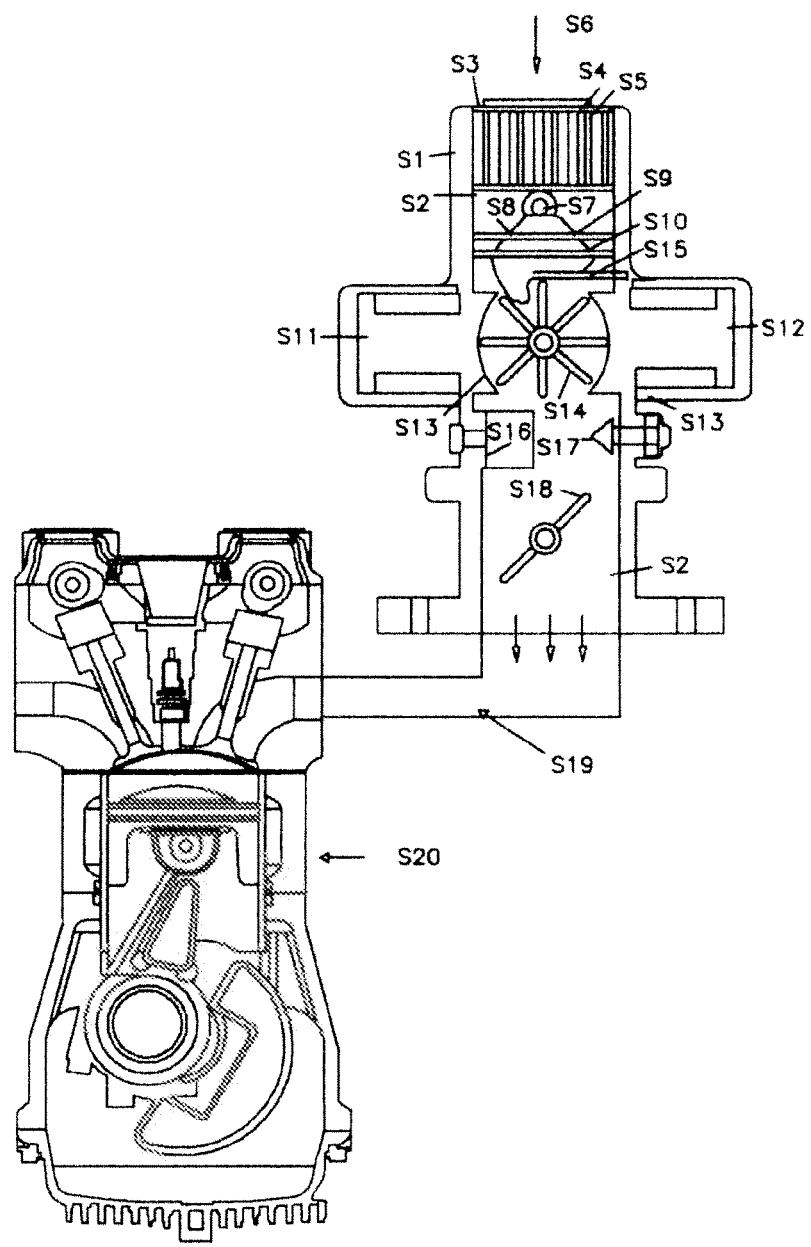
FIG. 3: illustrates the Sabetay engine/ozone generation system.
Figure 4:
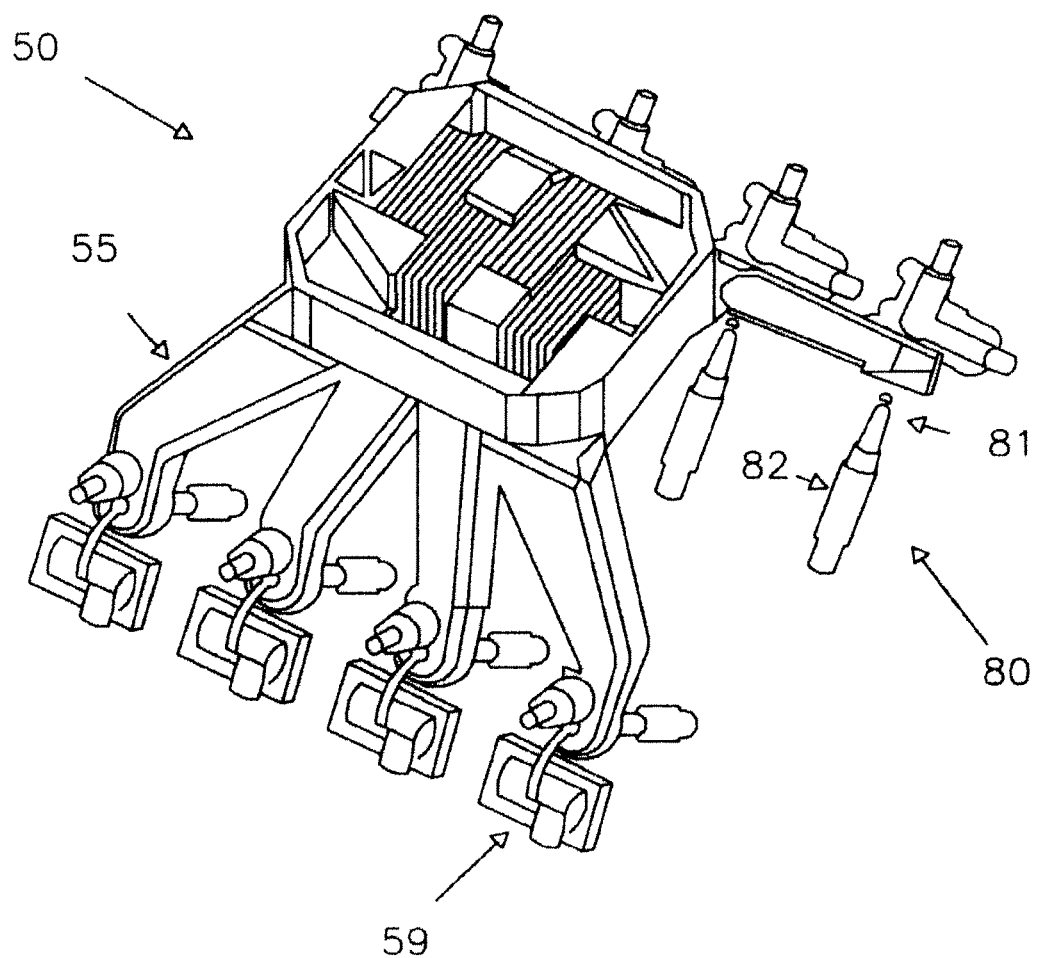
FIG. 4: illustrates a schematic view of the super-combustor.

The present invention may be embodied as a super-combustor alone (FIG. 4). The present invention may also be embodied as a super-combustor in combination with a passive injection combustion engine (FIGS. 5A, 5B and 5C), a direct injection combustion engine (FIG. 6A) and as a super-combustor in combination with a diesel combustion engine (FIGS. 10B-D). In the gasoline normal combustion engine approach, the super-combustor may be added to a combustion engine such as the one shown in FIG. 1, in which the combustion engine 30 may or may not have a gasoline fuel injector. The present invention may be embodied as an improved combustion engine using fuel injection with many of the standard combustion engine components plus the super-combustor built into the engine. (FIGS. 6A-6B). The present invention may also be embodied as a process for transforming ozone and fuel into thermal energy that is then transformed into mechanical energy and nitrogen. (FIGS. 9A-B). Other aspects of the invention may relate to a gasoline engine having an improved spark plug system comprising a spark plug and either a passive gasoline ignition chamber (if the engine does not have a direct fuel injector FIG. 7A-7E) or a direct injected gasoline ignition chamber (if the engine has one or more fuel injectors—FIGS. 8A and 8B). Finally, other aspects of the invention may relate to a diesel engine having an improved fuel injector system (FIGS. 10B-10A) comprising a diesel fuel injector and fuel injected diesel ignition chamber, FIGS. 11A-11D. In certain embodiments, the super-combustor and/or engine may be designed to provide mechanical energy to a vehicle such as a truck, bus, car, boat, or airplane.

Figure 5C:
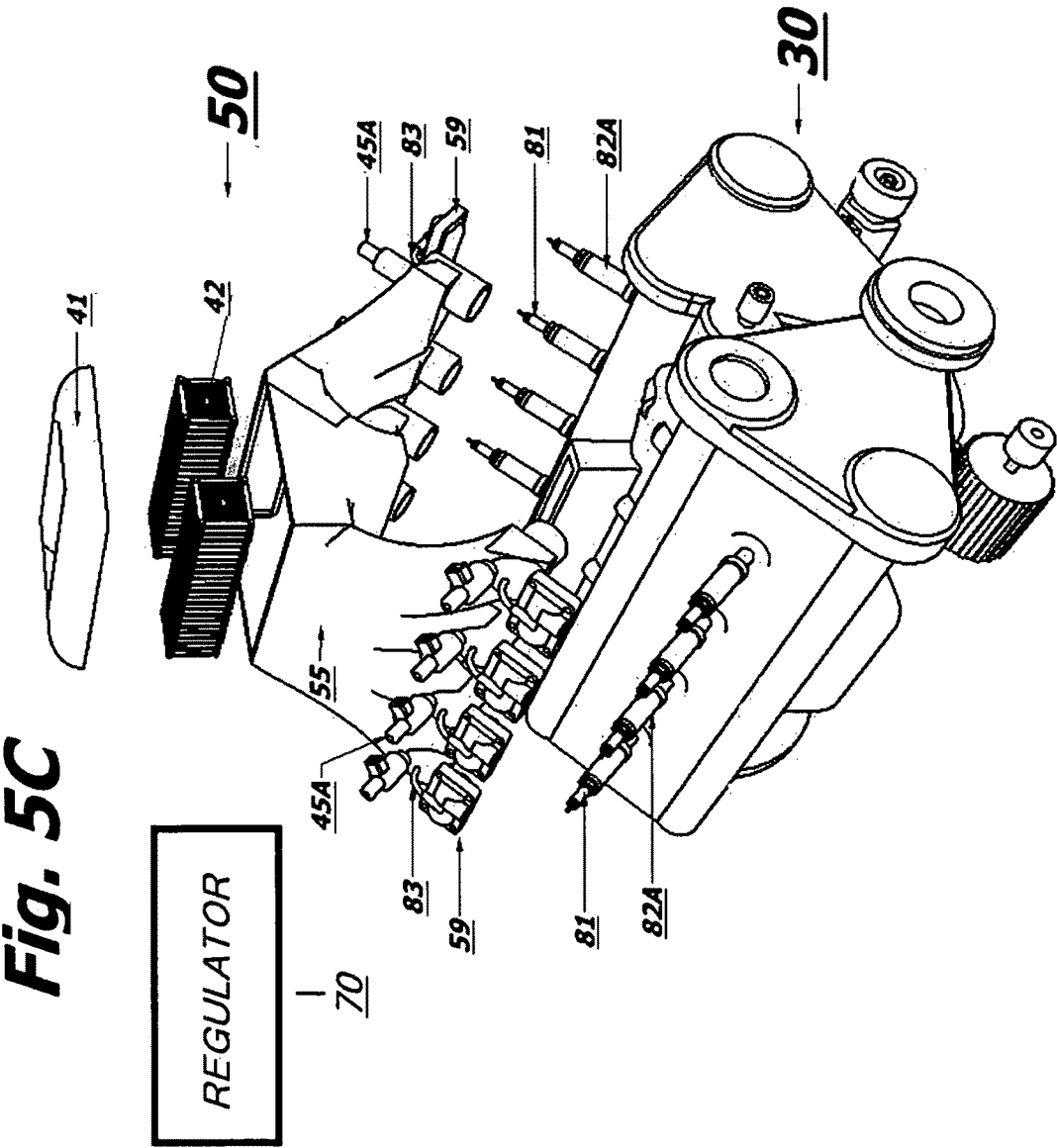
Figure 6A:
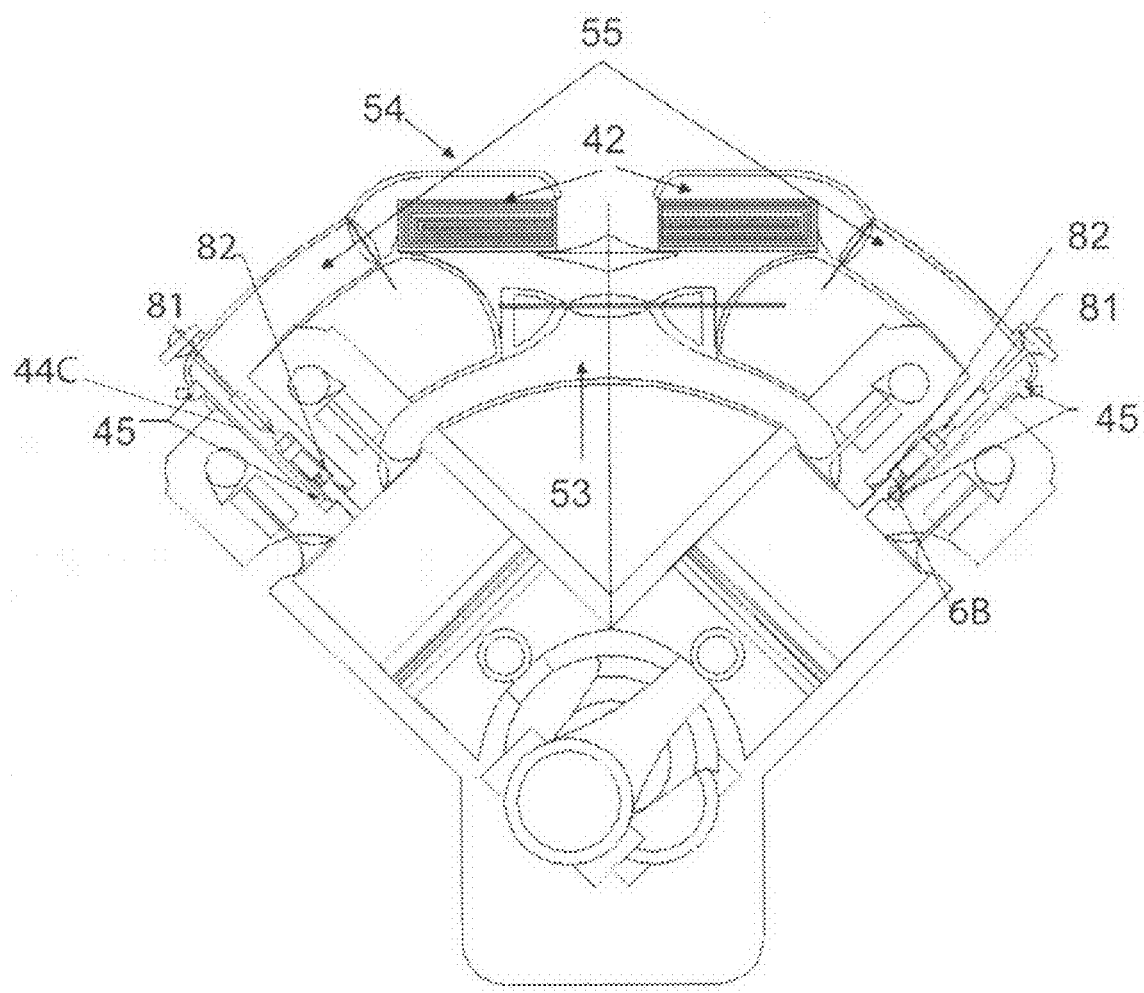
FIG. 6A-6B.
Figure 6B:
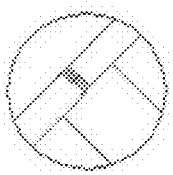

FIG. 5A illustrates a planar schematic view of an eight-cylinder, gasoline passive injection, engine 30 in combination with the super-combustor 50. FIG. 5B illustrates a top view of the same engine 30 and super-combustor 50. FIG. 5C illustrates a custom designed engine to operate with a super combustor 50. FIG. 6A illustrates a cross-sectional direct injection gasoline engine. As shown, the super-combustor 50 may comprise an ozone generator 42 (four are shown) and a delivery manifold 53 (one is shown). The ozone generator 42 may be surrounded by a housing 54 connected to multiple arms 55, and in certain embodiments one arm 55 for each cylinder of the engine. The location of the cylinder is shown as element 56, but the cylinder itself is not visible in FIG. 5A or 5B (see FIGS. 7A-7E for cross-sectional views of the cylinder 40.)

The super-combustor 50 may deliver fuel 33, ozone 32, and air 34 to cylinders of the engine by drawing air through an air intake 41 causing some of the air to pass through the ozone generators 42 into the ozone pathway 44B (FIGS. 7A-7E). In some embodiments, the ozone pathway may be placed inside one or more of the arms 55. The air manifold 57 may receive the remainder of the air from the air intake 41, which may be directed into the cylinders.

A regulator 70 (FIG. 5C) may control an air flow controller 70A, ozone flow controller 70B and/or an air intake controller 70C. The air, ozone, or air intake controllers may be a valve, flap, or other mechanical, electrical device which can regulate how much air or ozone passes through a specific pathway. Through regulating one or more of these controllers, the regulator 70 can affect how much air and/or ozone is combusted. Also, as shown in FIG. 5C, the same regulator (or another regulating device) may also control the ignition coils 59 which power the spark plug(s) 81, and/or passive gasoline fuel injector(s) 45A (if applicable) (FIGS. 7A-7E). For example, regulator 70 may control the timing or amount of fuel delivered by gasoline fuel injector 45A (if applicable). In a very simple configuration, regulator 70 may be a butterfly valve with an actuator controlled by an accelerator pedal or an electronic system. In other configurations, the regulator 70 itself may comprise circuitry, logic, and/or a processor with memory and software stored therein for implementing the control of these components. This software (referred to as Fuel Supply Control System (FSCS)) is software that can be programmed in a vehicle for example to direct the regulator 70 to receive input signals from sensors, process the signals, and calculate an appropriate or optimal amount of fuel 33 and/or ozone to deliver to the engine given certain operating conditions. The FSCS may also instruct the regulator 70 to provide the appropriate or optimal amount of fuel to be supplied to the passive gasoline ignition chamber 82A or the fuel injected gasoline ignition chamber 82B. The regulator 70 in the diesel engine embodiment (not shown in FIGS. 10B-B; 11A-D) would operate substantially the same as the regulator in the gasoline engine embodiments, but would not control ignition coils as spark plugs are absent in the diesel engine embodiment. Moreover, the FSCS in the diesel engine embodiment may instruct the regulator 70 to provide the appropriate or optimal amount of fuel to be supplied to the fuel injected diesel ignition chamber 82C.

The regulator 70 may also receive information from sensors which measure slope, altitude, and load for example. A slope sensor may determine whether the vehicle is ascending or descending a hill. If the regulator 70 determines for example the vehicle is ascending, the FSCS may cause the regulator 70 to supply more fuel to the fuel injected gasoline ignition chamber 82B, passive gasoline ignition chamber 82A, or fuel injected diesel ignition chamber 82C in such a way that the engine 30 maintains the previous non-ascending power levels. An altitude sensor may measure the atmospheric pressure for the purpose of determining how far above sea level the vehicle is positioned. Using that information, the regulator 70 can direct the gasoline fuel injectors 45A (or diesel fuel injectors 45B in the diesel engine embodiment) to supply more fuel 33 or ozone 32 to the fuel injected gasoline ignition chamber 82B (or fuel injected diesel ignition chamber 82C, respectively), as well as direct more air into the cylinder 40 in order to compensate for the decrease in air density allowing the super-combustor and engine to maintain near sea-level power levels. If the engine 30 and super-combustor 50 are installed in a load vehicle like an SUV or truck, the load sensor measures payload or tow weight. Using the information from the load sensor, the regulator 70 can direct an appropriate or optimal amount of fuel to the fuel injected gasoline ignition chamber 82B (or fuel injected diesel ignition chamber 82C in the diesel engine embodiment) to move the load with a smaller amount of fuel 33. Similarly, the regulator 70 may take into account air temperature, engine speed, octane content of the fuel, or other factors that affect the performance of the engine in determining how much fuel or ozone should be supplied into the fuel injected gasoline ignition chamber 82B (or fuel injected diesel ignition chamber 82C) and/or air into the cylinder 40. Regulator 70 may contain circuitry, logic, or a microprocessor for controlling the air to fuel ratio which may be around 14.7 grams of air per gram of fuel (plus or minus 5 grams) in some embodiments. Regulator 70 may also direct around 3 grams of ozone per gram of fuel (plus or minus 2 grams) to the final mixture of air 34, ozone 32, and fuel 33 to be combusted in the engine 30.

In some embodiments, the regulator 70 may have an input (such as a switch) settable by a user for changing how much horsepower and/or torque to produce. The input may also be able to increase/decrease the efficiency of the engine, possibly affecting gas mileage if the engine is installed in a vehicle. To increase the horsepower of the engine 30, the input may instruct the regulator 70 to increase the amount of fuel and/or ozone gas delivered to the fuel injected gasoline ignition chamber 82B (or fuel injected diesel ignition chamber 82C). To increase the efficiency of the engine, the input may instruct the regulator to decrease the amount of fuel and/or ozone gas delivered to the fuel injected gasoline ignition chamber 82B (or fuel injected diesel ignition chamber 82C). In some configurations, the horse power (HP) the engine creates will be inversely proportional with the efficiency of the engine, so that increases in horsepower (and/or torque) cause decreases in the gas mileage or efficiency of the engine (and vice versa.) To that end, the switch may have three power settings including names and settings such as "performance" (max HP/torque with lower efficiency/gas mileage), "balance" (middle ground HP and efficiency), and "conservative" (featuring high efficiency/gas mileage with lower amounts of HP/torque.) In order to accommodate higher horsepower programming, the engine manifold and cylinders may be created of low friction, highly resilient/reinforced materials.

In the passive injected gasoline engine embodiment, the downward movement of the piston cylinder head 46 generates a vacuum drawing ozone and fuel through the arm 55 and ozone pathway 44B into the passive gasoline ignition chamber 82A. In certain configurations, this vacuum allows the fuel 33 and ozone 32 to be drawn into a controlled opening (such as a flapper valve) 86 in the passive gasoline ignition chamber 82A. Generally, when the piston head 46 is in the upward position, the added pressure of air 34 in the passive gasoline ignition chamber 82A forces the flapper valve into a closed position. When the air pressure is reduced through the piston head moving downwardly, the flapper valve (positioned behind opening 86) opened by the vacuum allowing the ozone and fuel to enter the passive gasoline ignition chamber 82A. Various other configurations for the valve are possible such as a solenoid actuated valve or butterfly valve. Additionally use of a valve is optional, and a valveless configuration is contemplated. Fuel 33 and ozone gas 32 can be drawn into the passive gasoline ignition chamber 82A via separate pathways, or the pathways can be merged. Once fuel 33 and ozone gas 32 are in the passive gasoline ignition chamber 82A, ignition coil 59 may direct electricity into the spark plug system 80A through the spark plug wire 83 to ignite (that is, to ignite the fuel and ozone before it is combusted in the cylinder 40 of the engine 30) the combination of ozone gas 32 and fuel 33.

The direct injected gasoline engine, shown in FIG. 5, operates substantially the same way as the passive injected gasoline engine, except that fuel 33 is injected into the fuel injected gasoline ignition chamber 82B via a gasoline fuel injector 45A, and injection is not dependent on the downstroke of the cylinder head 46. The downstroke of the cylinder head 46 does, however, still draw air into the cylinder 40 and ozone 32 into the fuel injected gasoline ignition chamber 82B. The gasoline fuel injector 45A (FIGS. 7A-7E) may direct fuel into the arm 55 and/or ozone pathway 44B and eventually the fuel injected gasoline ignition chamber 82B. FIGS. 6A and 6B show an alternate embodiment of the direct fuel injected gasoline engine and super-combustor. In this embodiment, the fuel 33 is injected below the spark plug system 80A and may be directly injected into the fuel injected gasoline ignition chamber 82B. As shown in FIG. 6A, the fuel 33 and ozone 32 may be injected and drawn, respectively, into the fuel injected gasoline ignition chamber 82B via separate pathways—a fuel pathway 44C and an ozone pathway 44B (in FIG. 5A, by contrast, the ozone and fuel pathways are merged.) This configuration places the fuel closer to the spark plug 81, potentially producing improved efficiency. FIG. 6B shows an enlarged view of the output port of the gasoline fuel injector 45. In certain embodiments, it may be desirable to build the engine's block of materials having a zero or near-zero thermal expansion coefficient such as ceramics. This may allow the spark plug chamber to be constructed within the block without a cooling system. This configuration can create the temperature necessary to gasify the fuel and avoid transmitting this temperature to the block, while providing a system which allows starting the combustion process within the fuel injected gasoline ignition chamber 82B.

Figure 7A:
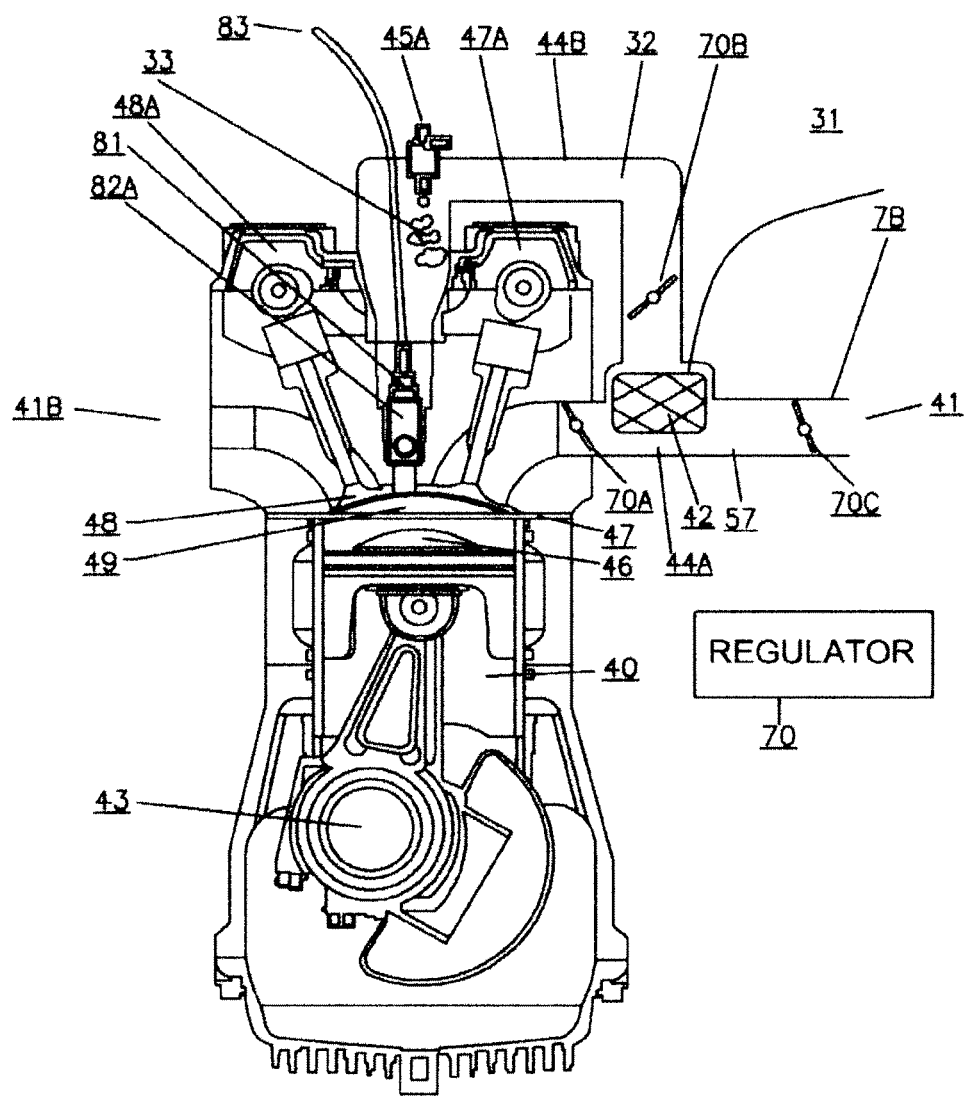
FIGS. 7A-7E: illustrate a cross-sectional view of a passive injection gasoline engine in combination with a super-combustor.
Figure 7B:
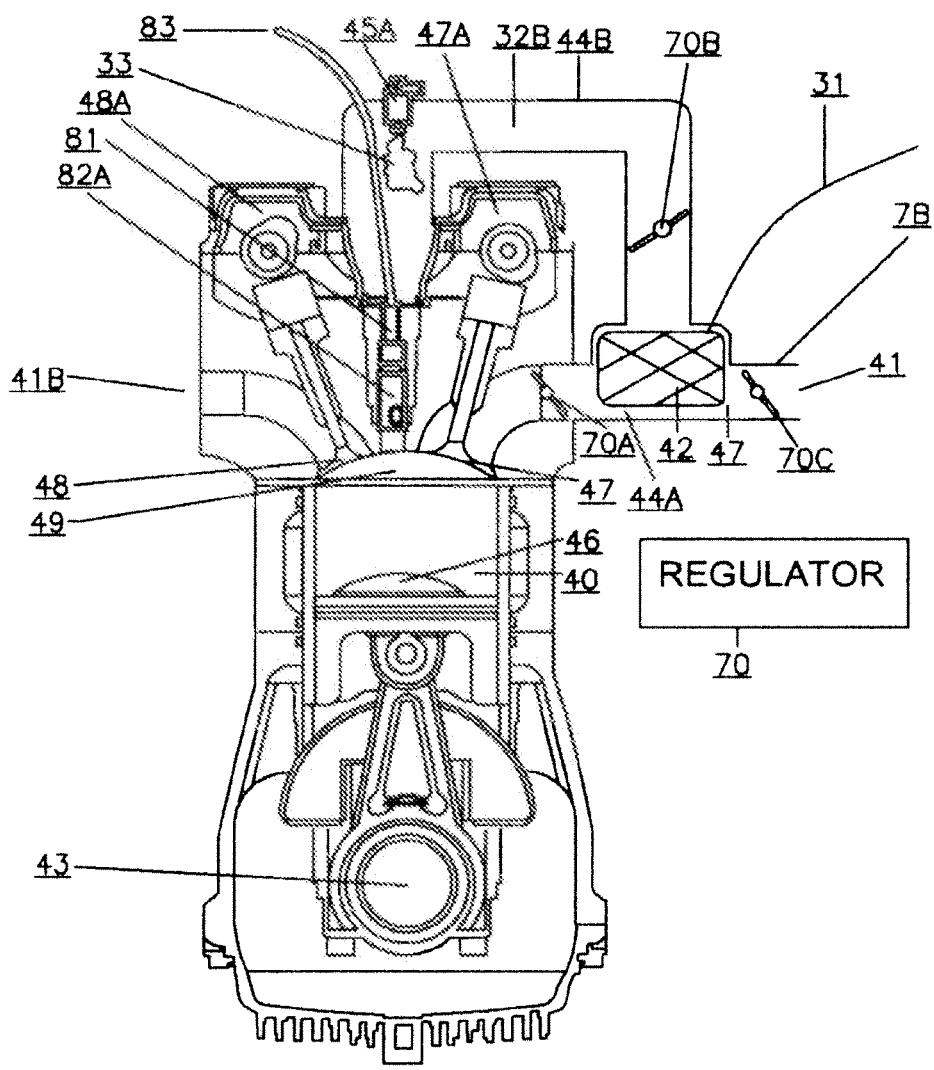
Figure 7C:
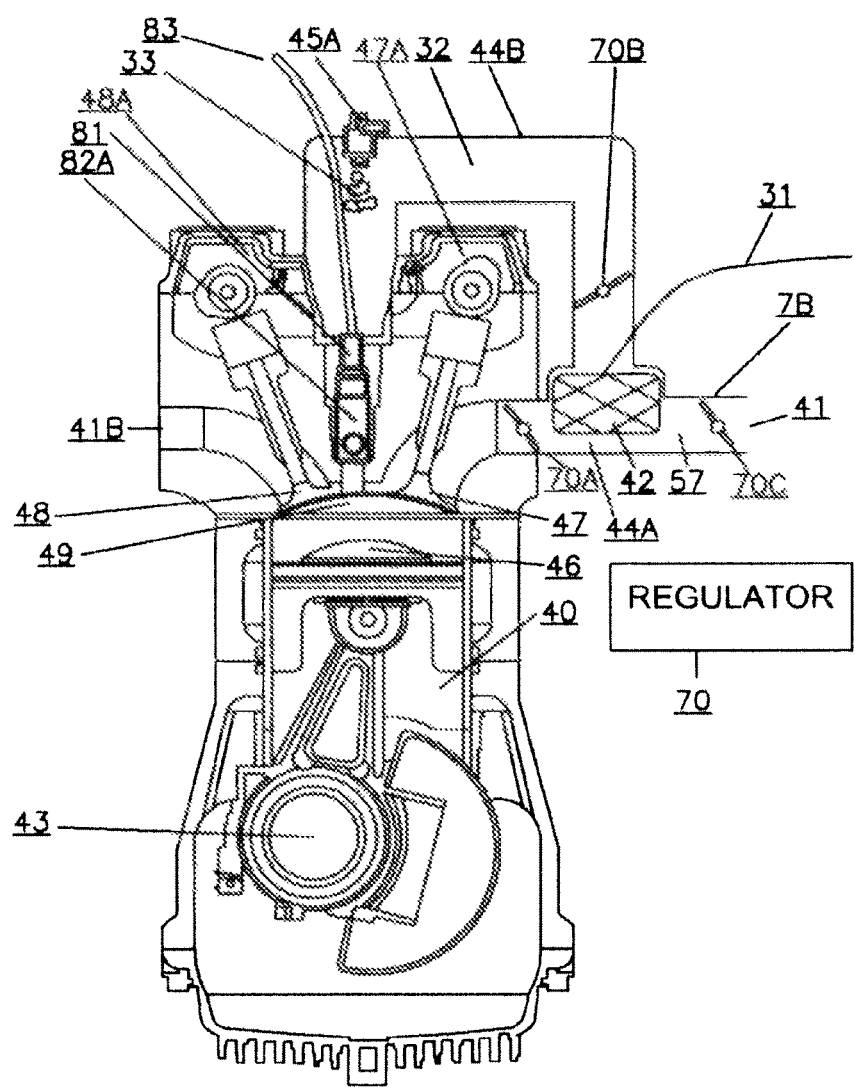
Figure 7D:
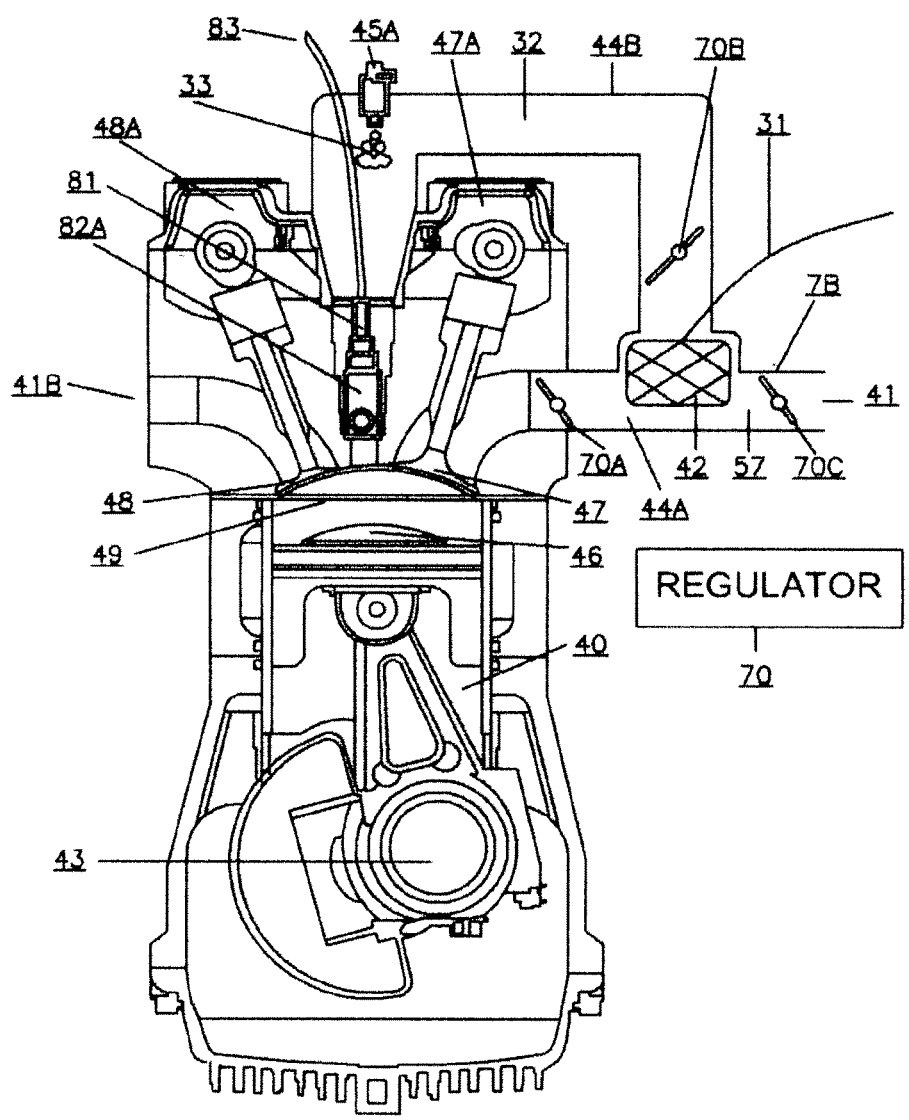
Figure 7E:
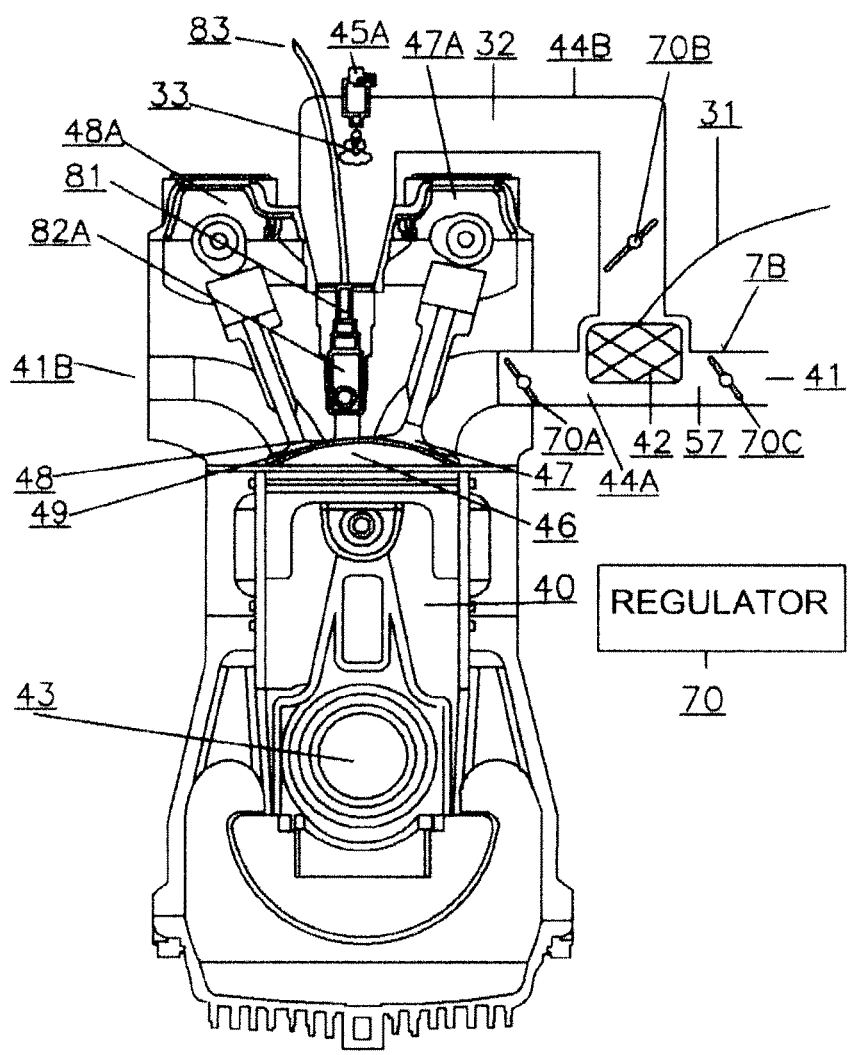

FIGS. 7A-7E illustrate schematic cross-sectional views of the ozone generator 42, delivery manifold 53, and cylinder 40 of a direct injected gasoline engine. However, the process outlined below is generally applicable to the passive injected gasoline engine as well. FIG. 7A illustrates the cylinder 40 in a compressed position with the piston head 46 near (or in a proximal position relative to) the cylinder top 49 with the air valve 47 in an open position and waste valve 48, controlled by waste valve controller 48A, in a closed position. FIG. 7B illustrates the cylinder 40 in an open position with the piston head 46 far from (or in a distal position relative to) the cylinder top 49 with the air valve 47 in a closed position; and the waste valve 48 in a closed position. FIG. 7C illustrates the cylinder 40 in a compressed position with the piston head 46 close to (or in a proximal position relative to) the cylinder top 49 with the air valve 47 in the closed position; and the waste valve 48 in a closed position. FIG. 7D illustrates the cylinder 40 in an open position with the piston head 46 far from (or in a distal position relative to) the cylinder top 49 with the air valve 47 in the closed position; and the waste valve 48 changing into an open position. FIG. 7E illustrates the cylinder 40 in a compressed position with the piston head 46 close to (or in a proximal position relative to) the cylinder top 49 with the air valve 47 in the closed position; and the waste valve 48 in an open position, concluding the exhaust stroke.

In FIG. 7A, air is drawn into the super-combustor 50 through the intake 41 as the cylinder head 46 moves in the downward direction, thereby creating a vacuum. The intake 41 may contain one, two, or three valves: an air intake controller 70C to control the air that enters the super-combustor 50, an air flow controller 70A to control the amount of air flowing into the cylinder 40, and/or an ozone controller 70B to control the amount of ozone flowing into the fuel injected gasoline ignition chamber 82B (or passive gasoline ignition chamber 82A). The regulator 70 may control these three controllers. In certain embodiments, fuel 33 does not enter the intake 41 nor is ozone gas 32 created there. The regulator 70 may direct electric current through wire 31 into the ozone generator 42 to convert the diatomic oxygen from the air into ozone gas, but nonelectric ozone generators may be used in other configurations. The configuration shown in FIG. 7A features a manifold 53 that splits into an air pathway 44A and an ozone pathway 44B. Air that passes through the ozone generator 42 in this particular embodiment is turned into ozone gas 32. The super-combustor 50 may or may not be constructed to allow some diatomic oxygen to pass into the ozone pathway 44B. (Other gases such as noble gases and nitrogen may also pass through the super-combustor depending on the configuration of the ozone generator 42.) In addition, the ozone generator 42 may be positioned so that all or most of the air entering the air intake 41 passes through the ozone generator 42. In those embodiments, most or all of the air which is not converted to ozone will flow into the air manifold 57 (FIG. 5A).

The air 34 passing through the air pathway 44A enters the cylinder 40. An air valve controller 47A, may place an air valve 47 in an open position to allow the cylinder 40 to draw in air. The suction comes from the rotation of the crankshaft 43 which causes the piston head 46 to move downwardly increasing the volume of the cylinder 40, thereby decreasing internal air pressure, and the suction of air from the air pathway 44A. When the cylinder 40 reaches the maximum volume (FIG. 7B), the air valve controller 47A may shut the air valve 47, and through the force of the continued rotation of the crankshaft 43, the piston head 46 is moved upward pressurizing the air inside the cylinder 40 (FIG. 7C).

As air is drawn into the cylinder, ozone gas 32 may also be drawn through the ozone pathway 44B. Fuel 33 may enter the super-combustor 50 (in the direct injected gasoline engine embodiment) via gasoline fuel injector 45. In this embodiment, the gasoline fuel injector 45 is placed within the ozone pathway 44B, but it could be placed in other locations. For example, the gasoline fuel injector 45 could be placed in the spark plug system 80A. By contrast, in the passive injected gasoline engine embodiment, there is no gasoline fuel injector 45 to inject fuel 33 into the passive gasoline ignition chamber 82A. Rather, fuel 33 gets drawn into the passive gasoline ignition chamber 82A by the downward stroke of the cylinder head 46.

Figure 8A:
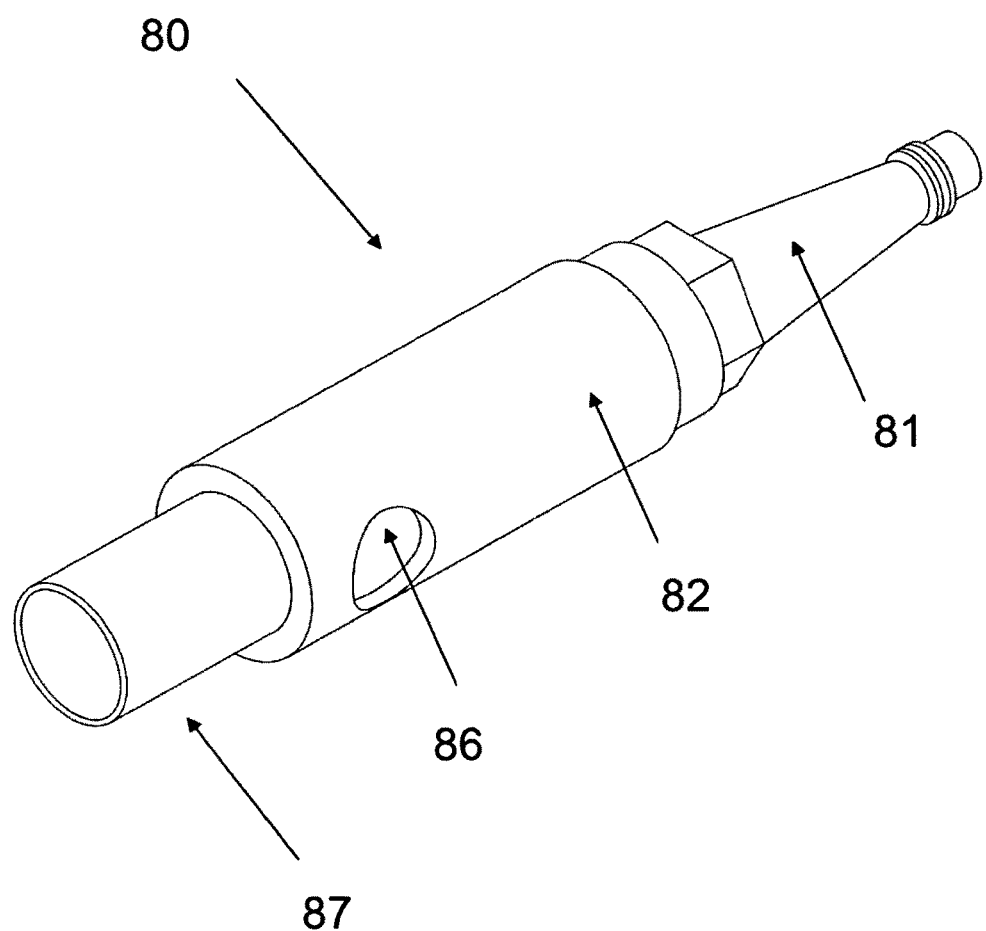
FIGS. 8A-8B: illustrate a schematic view of an embodiment of a spark plug system.
Figure 8B:
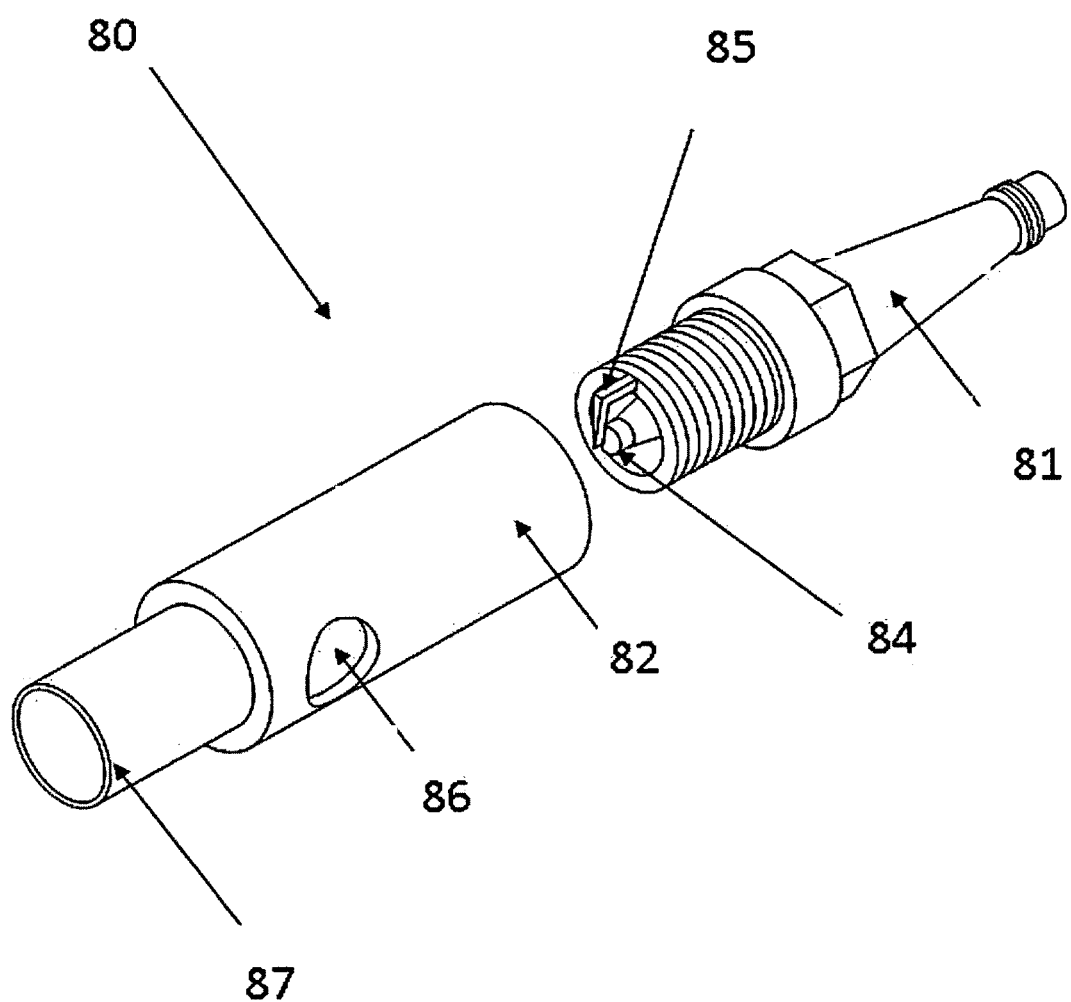
Figure 9A:
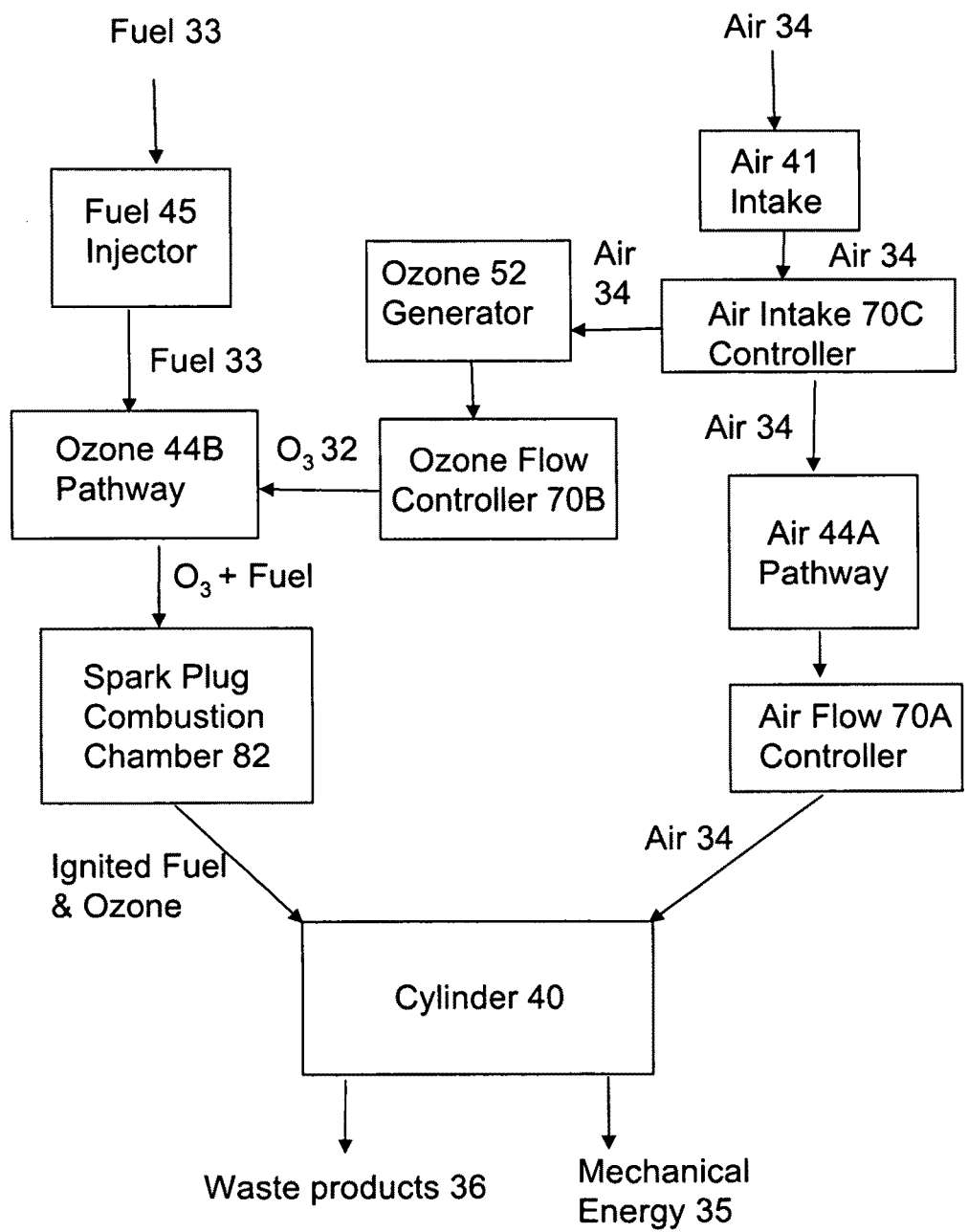
FIGS. 9A-B: illustrate processes for transforming air and fuel into mechanical energy and waste products.
Figure 9B:
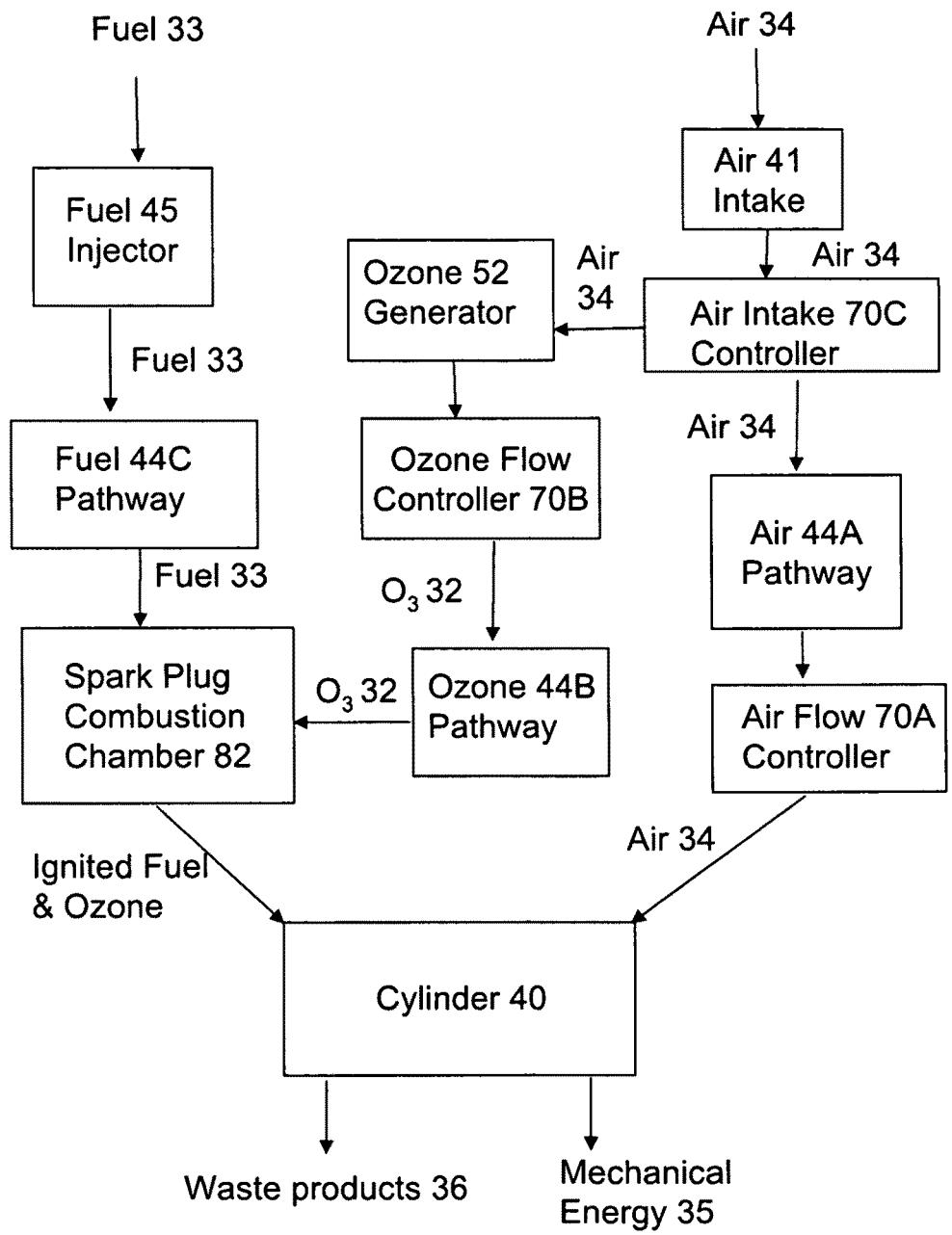
Figure 11A:
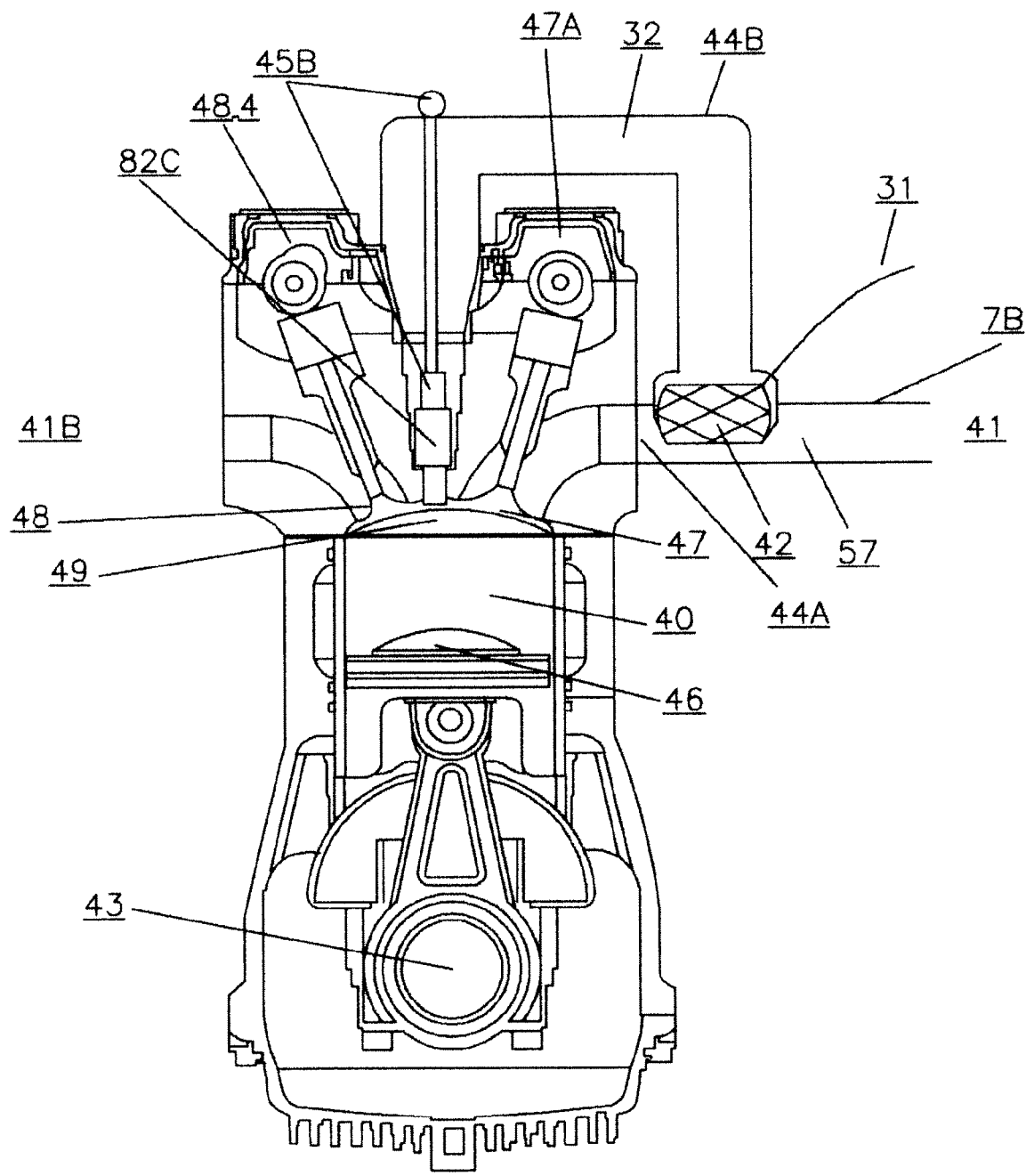
FIGS. 11A-D: illustrate cross-sectional views of the combustion cycle of a diesel engine in combination with a super-combustor.
Figure 11B:
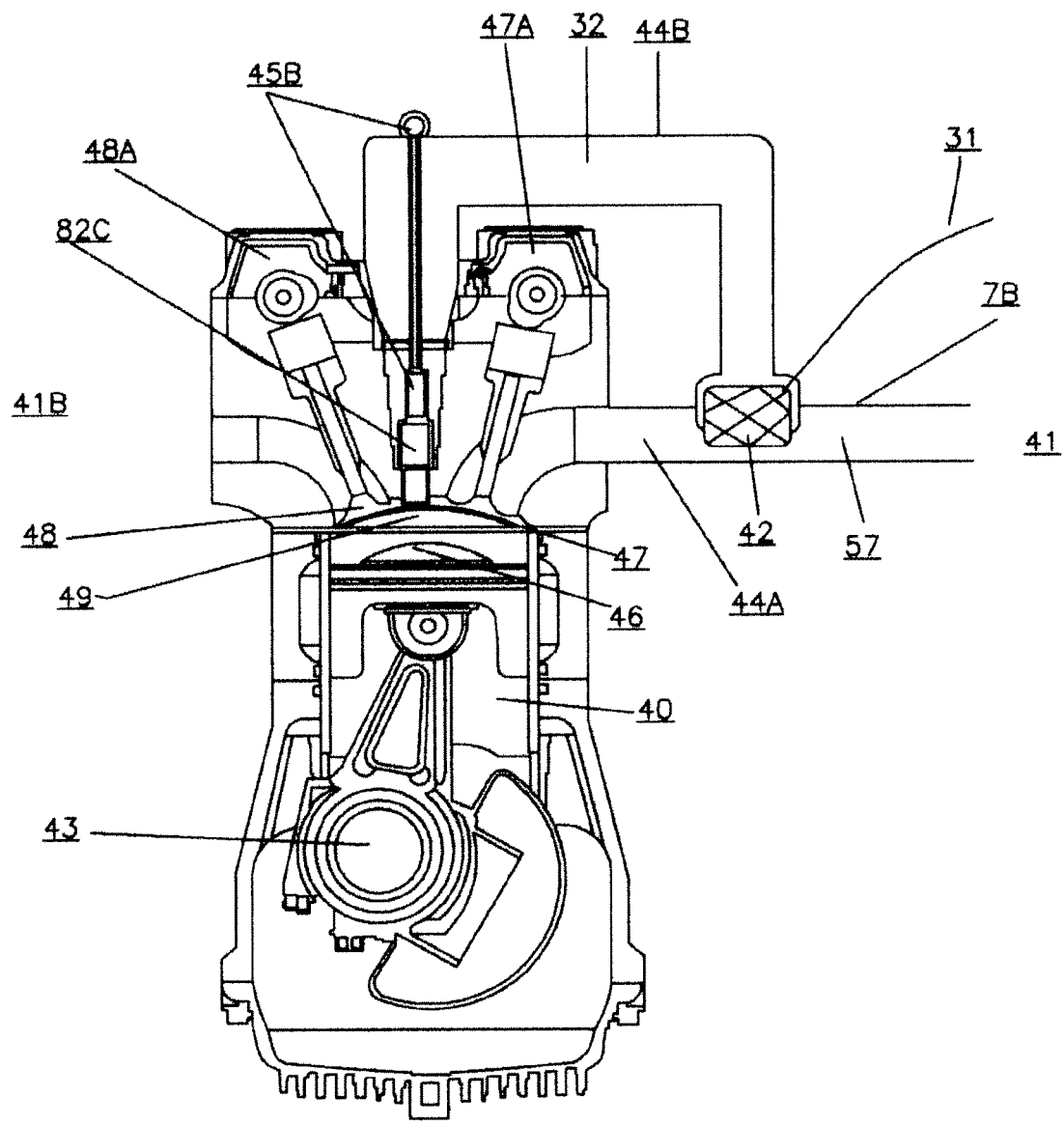
Figure 11C:
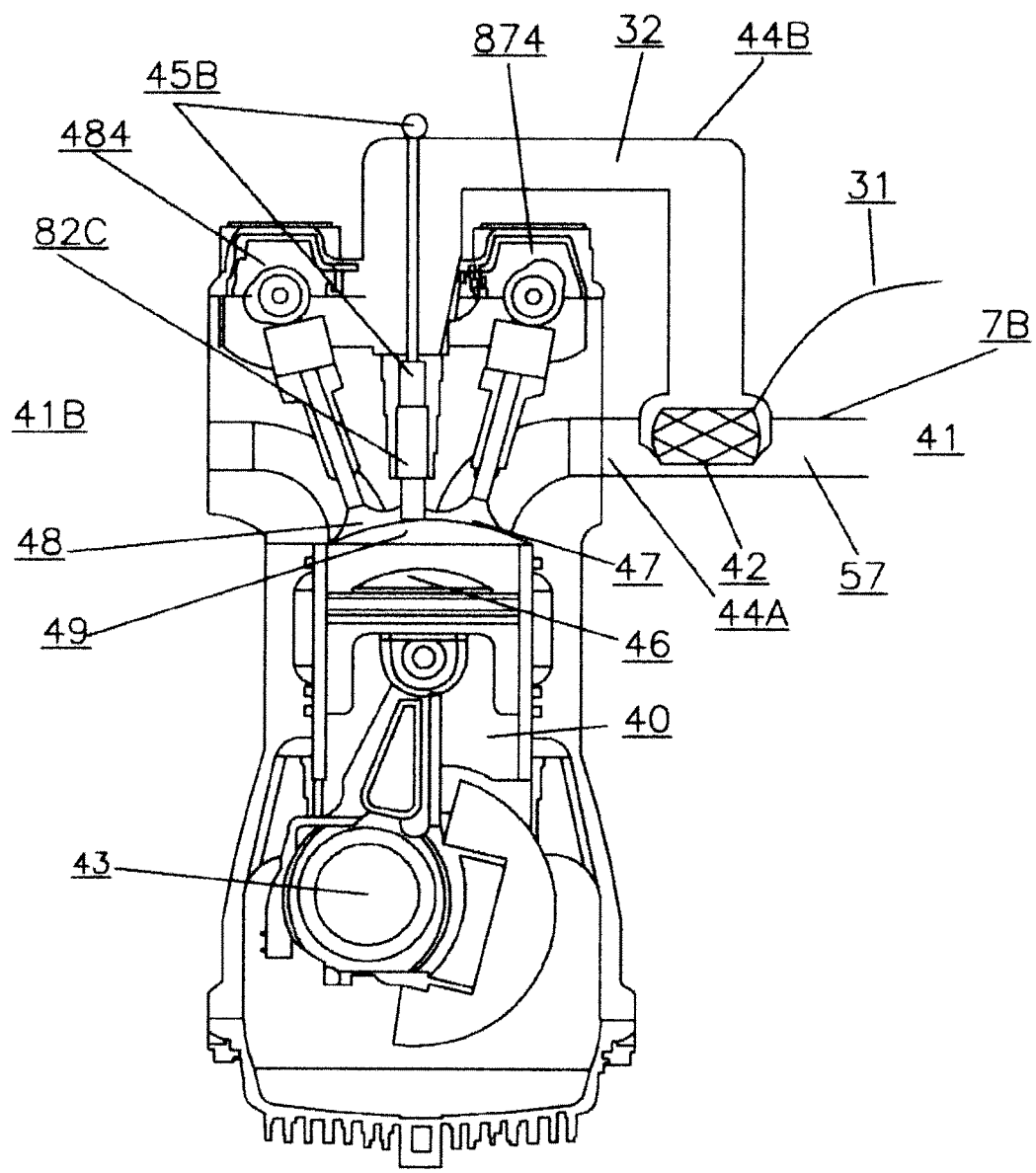
Figure 11D:
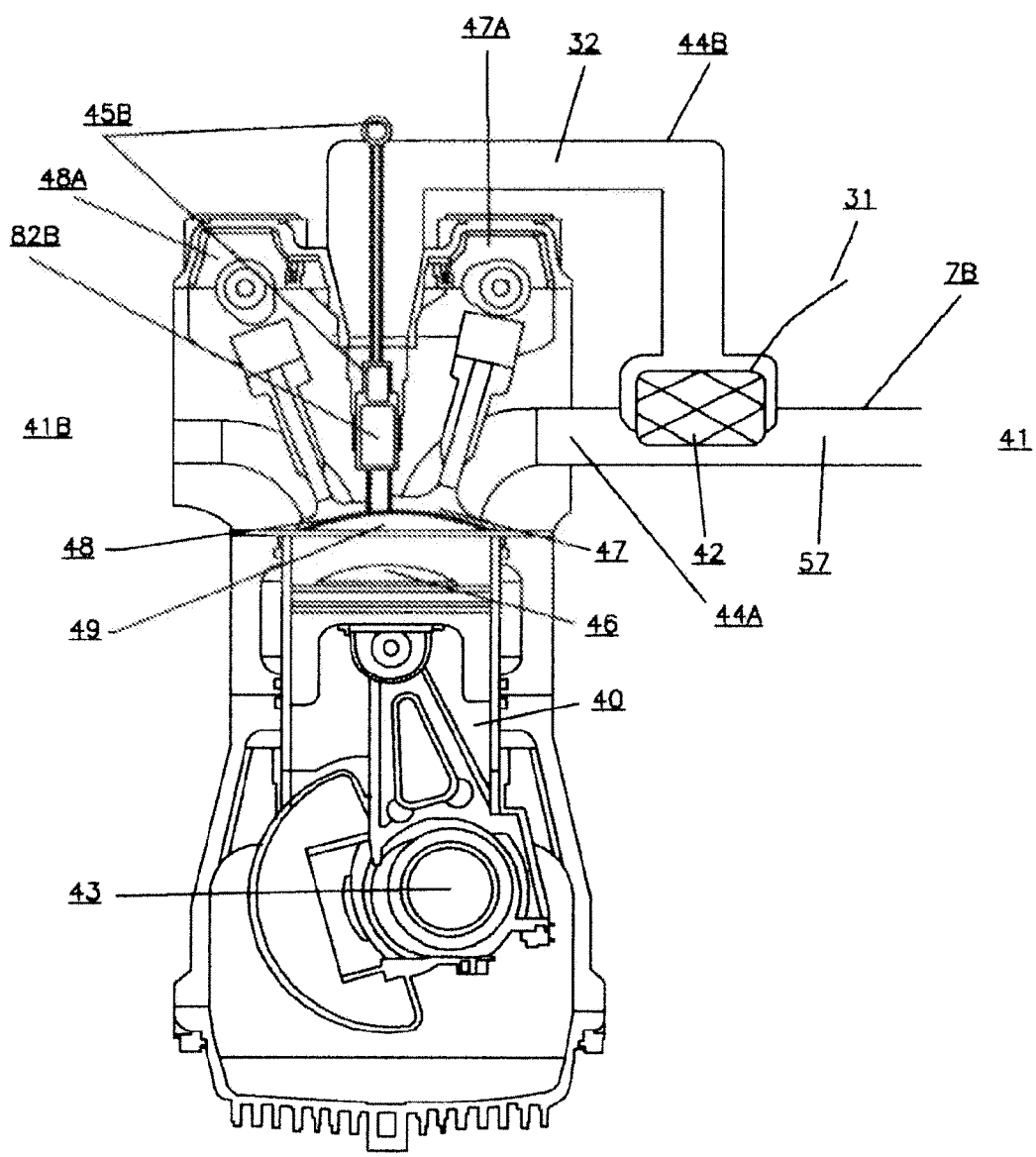

An enlarged view of the spark plug system 80A representative of both embodiments is shown in FIGS. 8A and 8B. Electricity flows through spark plug wire 83 to the center electrode 84 which ejects the electrons into the side electrode 85 forming an arc. In this configuration, the center electrode 84 functions as the cathode and the side electrode 85 functions as the anode, but the opposite configuration is possible. The spark plug system 80A may comprise a fuel injected gasoline ignition chamber 82B (FIG. 6A) (or passive gasoline ignition chamber 82A) and a spark plug 81. Fuel delivery chamber 87A may comprise threads for attaching the fuel injected gasoline ignition chamber 82B to the top of the cylinder to deliver ignited gasoline or to the cylinder of the engine.

Gasified fuel and ozone enter the fuel injected gasoline ignition chamber 82B (or passive gasoline ignition chamber 82A) through opening 86 (in some embodiments opening 86 may be regulated by a flapper valve 86B). The fuel 33 and ozone 32 are pulled into the fuel injected gasoline ignition chamber 82B (or passive gasoline ignition chamber 82A) by way of a vacuum force generated by the downward motion of the piston head 46. Once the ozone gas 32 and fuel 33 enter, the spark plug 81 generates the electric arc combusting the fuel 33 and ozone 32. In some embodiments, there may be some diatomic oxygen ($O_2$ in the fuel injected gasoline ignition chamber 82B or passive gasoline ignition chamber 82A, but in other configurations there is not, i.e., the combustion in the ignition chamber 82A or 82B is a diatomic-oxygen-starved combustion. When the piston head 46 is close to the cylinder top 49 (or in some embodiments closest to the cylinder top 49), the exploding fuel 33 and ozone 32 mixture expands into the cylinder 40 where the mixture combines with additional air 34, thereby generating a more powerful, second explosion which drives the cylinder head 46 downwardly—to the configuration shown in FIG. 7B. Residual heat from the combustion of the ozone gas and fuel may heat the fuel injected gasoline ignition chamber 82B (or passive gasoline ignition chamber 82A) so that a heater may not be needed. The operating temperature for both ignition chambers 82A or 82B is between 320-600 degrees Celsius, whereas the operating temperature inside the cylinder 40 may be between 70-190 degrees Celsius (since it is cooled by oil, water, and other cooling mechanisms of the vehicle.) From the position shown in FIG. 7B, the flywheel in the crankshaft and/or the combustion of one of the adjacent cylinders may turn the crankshaft 43 forcing the cylinder 40 to expel heat, water, $CO_2$, CO, and other waste products into the exhaust 41B.

The direct injected diesel engine embodiment uses diesel fuel and does not have a spark plug system 80A. The ignition chamber for this embodiment is a fuel injected diesel ignition chamber 82C. FIGS. 10B and 10A illustrate fuel injected diesel ignition chamber 82C for delivering ignited fuel and ozone to a diesel engine. The diesel fuel injector system 80B may contain a diesel fuel injector 89 for injecting diesel fuel; an electronic connection 88 for receiving an electrical signal from the regulator 70 to open or close a valve within the fuel injector 45 to provide fuel to the ignition chamber; and a controlled opening 86. Fuel in the diesel fuel injector 89 is under pressure, so when the valve is opened, fuel is injected into the fuel injected diesel ignition chamber 82C. The controlled opening 86 has an open and a closed position; whereby in the open position (which occurs when the cylinder is applying a vacuum force on the fuel injected diesel ignition chamber 82C) pressurized ozone gas surrounding the controlled opening is permitted to enter the fuel injected diesel ignition chamber 82C and in the closed position the controlled opening 86 prevents ignited fuel and ozone from escaping. To deliver ignited diesel fuel and ozone to the engine, a fuel delivery chamber 87B may be provided.

FIGS. 11A-11D illustrate a combustion cycle (admission, compression, combustion, and exhaust) utilizing diesel fuel as opposed to gasoline fuel, which cycle is substantially similar to that described with respect to the direct injected gasoline engine embodiment above. A process utilizing a diesel engine and the diesel fuel injector system 80B for distributing pre-ignited fuel to the engine may contain the following steps. The movement of the piston head 46 downward can cause air 34 to flow into the air intake 41. Air 34 drawn into the engine via the air intake 41 may be divided into the air pathway 44A and ozone pathway 44B. Air 34 that passes through the ozone pathway 44B may be converted into ozone gas 32 by the ozone generator 42. The ozone gas 32 then travels down the ozone pathway 44B. The ozone gas surrounds the fuel injected diesel ignition chamber 82C. As the piston head 46 of the cylinder 40 moves in a downward direction (admission stroke) a vacuum force is applied to the fuel injected diesel fuel ignition chamber 82C, opening the valve in the controlled opening 86. This allows ozone gas 32 to enter the fuel injected diesel fuel ignition chamber 82C. Additionally, air 34 enters the cylinder 40 during the admission stroke. Fuel 32 is also injected via the diesel fuel injector 45B into the diesel fuel ignition chamber 82C. When fuel 32 and ozone 33 enter the diesel fuel ignition chamber 82C, the fuel and ozone are heated from the chamber 82C. As the cylinder head 46 is driven to complete its compression stroke, fuel and ozone in the diesel fuel ignition chamber 82C are compressed. When the cylinder head 46 reaches the top of the cylinder 40, the increased pressure as well as heat from the diesel fuel ignition chamber 82C cause the fuel and ozone to ignite. The ignited fuel and ozone expands into cylinder 40, where the fuel and ozone mix with air, intensifying the explosion. This causes the piston head 46 to move downwardly (executing the combustion stroke.) The downward movement of the cylinder head powers the crank shaft which forces a second cylinder head to initiate its compression stroke. When the second piston head reaches the end of its compression stroke, the pressure in the second diesel fuel ignition chamber 82C is so high that the fuel and ozone ignite. The ignited fuel enters the second cylinder which initiates the second cylinder's combustion stroke. The movement of the second cylinder head drives the crank shaft 43 causing the first cylinder head 46 to initiate a second compression stroke. The process may be repeated. Excess energy from the crank shaft can be used to provide mechanical energy to other components such as gears. pre-combustion chamber FIGS. 9A-9B show a flow chart of a process for converting fuel and ozone into mechanical energy and waste products. The processes illustrated in FIGS. 9A-9B are exemplary and steps may be added, removed, or reordered in other embodiments. Fuel 33, generally stored in a fuel reservoir, is placed into a gasoline fuel injector 45A. The gasoline fuel injector 45A may feed the fuel into the ozone pathway 44B or into fuel pathway 44C (FIGS. 6 and 9B). Air 34 may be received by an air intake 41. An air intake valve 70C may regulate how much air flows into the air passage 44A and how much air 34 flows past the ozone generator 42. Air flow controller 70A may regulate how much air passes through the air pathway to the cylinder 40, and the ozone controller 70B may regulate how much ozone passes through the ozone pathway 44B. The ozone generator may send ozone (and other gases such as nitrogen or noble gases) to the ozone pathway 44B. Air 34 transferred into the air pathway 44A may be delivered to the cylinder 40. In the ozone pathway 44B, ozone gas 32, and fuel 33 may be mixed to form a fuel/ozone mixture 37. The mixture 37 may be transferred by suction created by the cylinder head 46 to the fuel injected gasoline ignition chamber 82B. Electricity may be run across the electrodes of the spark plug 81 to create an electric arc, combusting the mixture in the fuel injected gasoline ignition chamber 82B. The combusted mixture expands into the cylinder where it combines with the air in the cylinder 40 to form mechanical energy 35 and waste products 36.

It is claimed:

1. A method of using a system to ignite fuel and ozone gas comprising the steps of:
   receiving air with an air intake of the system;
   directing the air into an ozone generator; so that at least a portion of the air is converted into ozone gas;
   directing the ozone gas into an ignition chamber;
   directing fuel into the ignition chamber;
   igniting fuel and ozone gas in the ignition chamber;
   delivering ignited fuel and ozone gas to a cylinder of a combustion engine;
   delivering fuel to the ignition chamber using a fuel injector;
   regulating how much air enters the system using an air intake controller;
   regulating how much air enters the cylinder through an air flow controller;
   regulating how much ozone enters the cylinder through an ozone controller;
   powering a spark plug with an ignition coil;
   regulating how much fuel enters the ignition chamber and at what times;
   providing a regulator configured to control the fuel injector, air intake controller, air flow controller, ozone controller, and ignition coil; and
   receiving, at the regulator, slope information, altitude information, and load information from sensors.

2. The method of claim 1 comprising the step of using the spark plug to ignite fuel and ozone gas in the ignition chamber wherein the ignition chamber is a passive gasoline ignition chamber and is connected to the spark plug.

3. The method of claim 1 wherein the ignition chamber is a fuel injected gasoline ignition chamber and is connected to the spark plug, and wherein fuel is injected into the fuel injected gasoline ignition chamber via a gasoline fuel injector.

4. The method of claim 3 comprising the step of using the spark plug to ignite fuel and ozone gas in the fuel injected gasoline ignition chamber.

5. The method of claim 1, wherein the ignition chamber is a diesel ignition chamber; the method comprising the steps: of pressurizing the fuel and ozone in the diesel ignition chamber; heating the diesel ignition chamber; and wherein additional heat and pressure cause fuel in the diesel ignition chamber to ignite.

6. The method of claim 1 comprising:
   running a fuel supply control software with a processor of the regulator; and
   programming the fuel supply control system software from inside of a vehicle equipped with the system and regulator to determine an optimal amount of fuel to supply to the ignition chamber.

7. The method of claim 1 comprising directing with the regulator about 14.7 grams of air per gram of fuel, and 3 grams of ozone per gram fuel into the ignition chamber.

8. A method of using a system to ignite fuel and ozone gas comprising the steps of:
   receiving air with an air intake of the system;
   directing the air into an ozone generator; so that at least a portion of the air is converted into ozone gas;
   directing the ozone gas into an ignition chamber;
   directing fuel into the ignition chamber;
   igniting fuel and ozone gas in the ignition chamber;
   delivering ignited fuel and ozone gas to a cylinder of a combustion engine;
   delivering fuel to the ignition chamber using a fuel injector;
   regulating how much air enters the system using an air intake controller;
   regulating how much air enters the cylinder through an air flow controller;
   regulating how much ozone enters the cylinder through an ozone controller;
   powering a spark plug with an ignition coil;
   regulating how much fuel enters the ignition chamber and at what times; and providing a regulator configured to control the fuel injector, air intake controller, air flow controller, ozone controller, and ignition coil;
running a fuel supply control software with a processor of the regulator;
programming the fuel supply control system software from inside of a vehicle equipped with the system and regulator to determine an optimal amount of fuel to supply to the ignition chamber; and
setting a switch to control how much horsepower and torque the engine produces;
wherein the switch has a first setting to instruct the regulator to increase an amount of fuel and ozone gas delivered to the ignition chamber; a second setting to instruct the regulator to decrease an amount of fuel and ozone gas delivered to the ignition chamber.

9. The method of claim 8 comprising receiving signals from sensors with the regulator; processing the signals with the regulator to determine operating condition data; and calculating an amount of fuel to deliver to the ignition chamber from the operating condition data.

10. A method of delivering ignited fuel and ozone gas to a cylinder of a combustion engine, said method comprising the steps of:
directing air into an ozone generator; so that at least a portion of the air is converted into ozone gas;
directing fuel into an ignition chamber;
performing a downstroke with a piston head of the combustion engine to draw the ozone gas into the ignition chamber;
igniting fuel and ozone gas in the ignition chamber so that the fuel and ozone gas is already ignited when it expands into the cylinder of the combustion engine driving the piston head in a downward motion for turning a crankshaft;
performing an upstroke in the cylinder to pressurize the fuel and ozone mixture; and
adding air from an air intake to increase explosive properties associated with the ignited fuel and ozone to drive the piston head in the cylinder downwardly;
delivering fuel to the ignition chamber using a fuel injector;
regulating how much air enters the system using an air intake controller;
regulating how much air enters the cylinder through an air flow controller;
regulating how much ozone enters the cylinder through an ozone controller;
powering a spark plug with an ignition coil;
regulating how much fuel enters the ignition chamber and at what times;
providing a regulator configured to control the fuel injector, air intake controller, air flow controller, ozone controller, and ignition coil; and
receiving, at the regulator, slope information, altitude information, and load information from sensors.

11. The method of claim 10 wherein the ignition chamber is a passive gasoline ignition chamber, whereby fuel is directed into the passive gasoline ignition chamber by the piston head performing a downstroke.

12. The method of claim 11 comprising the step of using the spark plug to ignite fuel and ozone gas in the passive gasoline ignition chamber.

13. The method of claim 12 wherein the ignition chamber is a fuel injected diesel ignition chamber, whereby fuel is directed into the fuel injected diesel ignition chamber via a diesel fuel injector.

14. The method of claim 10 comprising directing with a regulator about 14.7 grams of air per gram of fuel, and 3 grams of ozone per gram fuel into the ignition chamber.

15. A method of delivering ignited fuel and ozone gas to a cylinder of a combustion engine, said method comprising the steps of:
directing air into an ozone generator, so that at least a portion of the air is converted into ozone gas;
directing fuel into an ignition chamber;
performing a downstroke with a piston head of the combustion engine to draw the ozone gas into the ignition chamber;
igniting fuel and ozone gas in the ignition chamber so that the fuel and ozone gas is already ignited when it expands into the cylinder of the combustion engine driving the piston head in a downward motion for turning a crankshaft;
performing an upstroke in the cylinder to pressurize the fuel and ozone mixture; and
adding air from an air intake to increase explosive properties associated with the ignited fuel and ozone to drive the piston head in the cylinder downwardly;
delivering fuel to the ignition chamber using a fuel injector;
regulating how much air enters the system using an air intake controller;
regulating how much air enters the cylinder through an air flow controller;
regulating how much ozone enters the cylinder through an ozone controller;
powering a spark plug with an ignition coil;
regulating how much fuel enters the ignition chamber and at what times;
providing a regulator configured to control the fuel injector, air intake controller, air flow controller, ozone controller, and ignition coil;
running a fuel supply control software with a processor of the regulator;
programming the fuel supply control system software from inside of a vehicle equipped with the system and regulator to determine an optimal amount of fuel to supply to the ignition chamber; and
setting a switch to control how much horsepower and torque the engine produces;
wherein the switch has a first setting to instruct the regulator to increase an amount of fuel and ozone gas delivered to the ignition chamber; and a second setting to instruct the regulator to decrease an amount of fuel and ozone gas delivered to the ignition chamber.

16. The method of claim 15 comprising receiving signals from sensors with the regulator; processing the signals to determine operating condition data; and calculating an amount of fuel to deliver to the ignition chamber from the operating condition data.

17. A process for converting fuel and ozone into mechanical energy and waste; said process including the steps of:
placing fuel into a fuel injector;
directing the fuel into an ignition chamber;
transforming air into ozone gas using an ozone generator;
sending air into a cylinder of a combustion engine;
sending at least some of the ozone gas into the ignition chamber to form a mixture of ozone gas and fuel;
igniting the fuel and ozone mixture in the ignition chamber;
directing the ignited fuel and ozone gas mixture into the cylinder of the engine;

generating a more powerful explosion of fuel, air, and ozone gas driving a piston head in the cylinder into a downward position;

delivering fuel to the ignition chamber using a fuel injector;

regulating how much air enters the system using an air intake controller;

regulating how much air enters the cylinder through an air flow controller;

regulating how much ozone enters the cylinder through an ozone controller;

powering a spark plug with an ignition coil;

regulating how much fuel enters the ignition chamber and at what times;

providing a regulator configured to control the fuel injector, air intake controller, air flow controller, ozone controller, and ignition coil; and receiving, at the regulator, slope information, altitude information, and load information from sensors.

18. The method of claim 17 wherein the ignition chamber is a passive gasoline ignition chamber, which is connected to the spark plug whose electrodes are positioned within the passive gasoline ignition chamber.

19. The method of claim 17 wherein the ignition chamber is a fuel injected gasoline ignition chamber, which is connected to the spark plug whose electrodes are positioned within the fuel injected gasoline ignition chamber.

20. The method of claim 17 comprising directing with the regulator about 14.7 grams of air per gram of fuel, and 3 grams of ozone per gram fuel into the ignition chamber.

21. A process for converting fuel and ozone into mechanical energy and waste; said process including the steps of:

placing fuel into a fuel injector;

directing the fuel into an ignition chamber;

transforming air into ozone gas using an ozone generator;

sending air into a cylinder of a combustion engine;

sending at least some of the ozone gas into the ignition chamber to form a mixture of ozone gas and fuel;

igniting the fuel and ozone mixture in the ignition chamber;

directing the ignited fuel and ozone gas mixture into the cylinder of the combustion engine;

generating a more powerful explosion of fuel, air, and ozone gas driving a piston head in the cylinder into a downward position;

delivering fuel to the ignition chamber using a fuel injector;

regulating how much air enters the system using an air intake controller;

regulating how much air enters the cylinder through an air flow controller;

regulating how much ozone enters the cylinder through an ozone controller;

powering a spark plug with an ignition coil;

regulating how much fuel enters the ignition chamber and at what times;

providing a regulator configured to control the fuel injector, air intake controller, air flow controller, ozone controller, and ignition coil; running a fuel supply control software with a processor of the regulator; programming the fuel supply control system software from inside of a vehicle equipped with the system and regulator to determine an optimal amount of fuel to supply to the ignition chamber; and setting a switch to control how much horsepower and torque the combustion engine produces; wherein the switch has a first setting to instruct the regulator to increase an amount of fuel and ozone gas delivered to the ignition chamber; and a second setting to instruct the regulator to decrease an amount of fuel and ozone gas delivered to the ignition chamber.

22. The method of claim 21 comprising receiving signals from sensors with the regulator; processing the signals with the regulator to determine operating condition data; and calculating an amount of fuel to deliver to the ignition chamber from the operating condition data.

\* \* \* \* \*